(12) United States Patent
Takeuchi

(10) Patent No.: US 11,075,556 B2
(45) Date of Patent: Jul. 27, 2021

(54) CORELESS ELECTRIC MACHINE WITH MAGNET COILS WITH EFFECTIVE COIL PART AND END COIL PARTS

(71) Applicant: Kesatoshi Takeuchi, Nagano (JP)

(72) Inventor: Kesatoshi Takeuchi, Nagano (JP)

( * ) Notice: Subject to any disclaimer, the term of this patent is extended or adjusted under 35 U.S.C. 154(b) by 6 days.

(21) Appl. No.: 16/480,746

(22) PCT Filed: Jan. 16, 2018

(86) PCT No.: PCT/JP2018/000901
§ 371 (c)(1),
(2) Date: Jul. 25, 2019

(87) PCT Pub. No.: WO2018/139245
PCT Pub. Date: Aug. 2, 2018

(65) Prior Publication Data
US 2019/0363596 A1  Nov. 28, 2019

(30) Foreign Application Priority Data

Jan. 30, 2017  (JP) .............................. JP2017-014489

(51) Int. Cl.
*H02K 3/04* (2006.01)
*H02K 3/47* (2006.01)
(Continued)

(52) U.S. Cl.
CPC ................ *H02K 3/04* (2013.01); *H02K 3/47* (2013.01); *H02K 5/08* (2013.01); *H02K 15/04* (2013.01);
(Continued)

(58) Field of Classification Search
CPC .. H02K 3/04; H02K 3/47; H02K 3/22; H02K 3/24; H02K 3/26; H02K 3/28; H02K 3/30;
(Continued)

(56) References Cited

U.S. PATENT DOCUMENTS 5,304,884 A * 4/1994 Kitajima .................. H02K 3/04
  310/179
6,570,273 B2 * 5/2003 Hazelton ................ H02K 41/03
  310/12.21
(Continued)

FOREIGN PATENT DOCUMENTS

DE          101 13 831 A1    2/2002
DE    11 2007 000 364 T5   11/2008
(Continued)

*Primary Examiner* — Maged M Almawri
(74) *Attorney, Agent, or Firm* — Global IP Counselors, LLP

(57) ABSTRACT

A coil assembly of a stator is configured in such a manner that an air core region of each magnet coil houses effective coil parts of different magnet coils. The outer shape of each magnet coil in a section perpendicular to a center axis of a rotor is a divided ring-like shape defined by dividing a circular ring into equal N parts. Two sides of the divided ring-like shape form an angle set to be 360°/N or less. Each magnet coil is made of a coil conductive wire including a conductive wire bundle as a bundle of multiple non-insulated conductive wires each being a non-insulated wire, and an insulating coating layer covering the periphery of the conductive wire bundle.

6 Claims, 20 Drawing Sheets

(51) Int. Cl.
  *H02K 5/08*    (2006.01)
  *H02K 15/04*   (2006.01)
  *H02K 15/06*   (2006.01)
  *H02K 21/14*   (2006.01)
  *H02K 29/08*   (2006.01)
  *H02K 41/03*   (2006.01)

(52) U.S. Cl.
  CPC ........... *H02K 15/066* (2013.01); *H02K 21/14* (2013.01); *H02K 29/08* (2013.01); *H02K 41/03* (2013.01)

(58) Field of Classification Search
  CPC ............ H02K 3/32; H02K 3/325; H02K 3/34; H02K 3/345; H02K 5/08; H02K 15/066; H02K 15/04; H02K 21/14; H02K 29/08; H02K 41/03; H02K 2213/03
  USPC .... 310/179–208, 216.001, 216.022, 216.003
  See application file for complete search history.

(56) References Cited

U.S. PATENT DOCUMENTS

| | | | | |
|---|---|---|---|---|
| 9,825,497 | B2 * | 11/2017 | Rippel | H02K 3/47 |
| 2002/0050395 | A1 * | 5/2002 | Kusumoto | H02K 15/105 |
| | | | | 174/128.2 |
| 2002/0089237 | A1 * | 7/2002 | Hazelton | H02K 41/03 |
| | | | | 310/12.25 |
| 2004/0010908 | A1 * | 1/2004 | Kobayashi | H02K 15/0442 |
| | | | | 29/596 |
| 2004/0061383 | A1 * | 4/2004 | Tsuboi | H02K 41/03 |
| | | | | 310/13 |
| 2011/0291532 | A1 * | 12/2011 | Takeuchi | B60L 58/40 |
| | | | | 310/68 B |
| 2012/0293035 | A1 * | 11/2012 | Nakamura | H02K 3/47 |
| | | | | 310/208 |
| 2012/0306310 | A1 * | 12/2012 | Takeuchi | H02K 3/04 |
| | | | | 310/208 |
| 2013/0062986 | A1 * | 3/2013 | Takeuchi | H02K 3/47 |
| | | | | 310/208 |
| 2013/0062990 | A1 * | 3/2013 | Takeuchi | B62M 6/40 |
| | | | | 310/216.004 |
| 2013/0082560 | A1 * | 4/2013 | Takeuchi | B60L 50/20 |
| | | | | 310/156.01 |
| 2014/0084759 | A1 * | 3/2014 | Takeuchi | H02K 1/278 |
| | | | | 310/68 B |
| 2019/0222102 | A1 * | 7/2019 | Witczak | H02K 1/32 |
| 2019/0273409 | A1 * | 9/2019 | Lee | H02K 3/04 |

FOREIGN PATENT DOCUMENTS

| | | |
|---|---|---|
| JP | 59-096605 A | 6/1984 |
| JP | 63-282664 A | 11/1988 |
| JP | 2002-027693 A | 1/2002 |
| JP | 2002-272049 A | 9/2002 |
| JP | 2007-227263 A | 9/2007 |
| JP | 2010-252407 A | 11/2010 |
| JP | 2012-244643 A | 12/2012 |
| JP | 2012-253922 A | 12/2012 |
| JP | 2013-066335 A | 4/2013 |
| JP | 2016-220393 A | 12/2016 |
| WO | 2015/092884 A1 | 6/2015 |

* cited by examiner

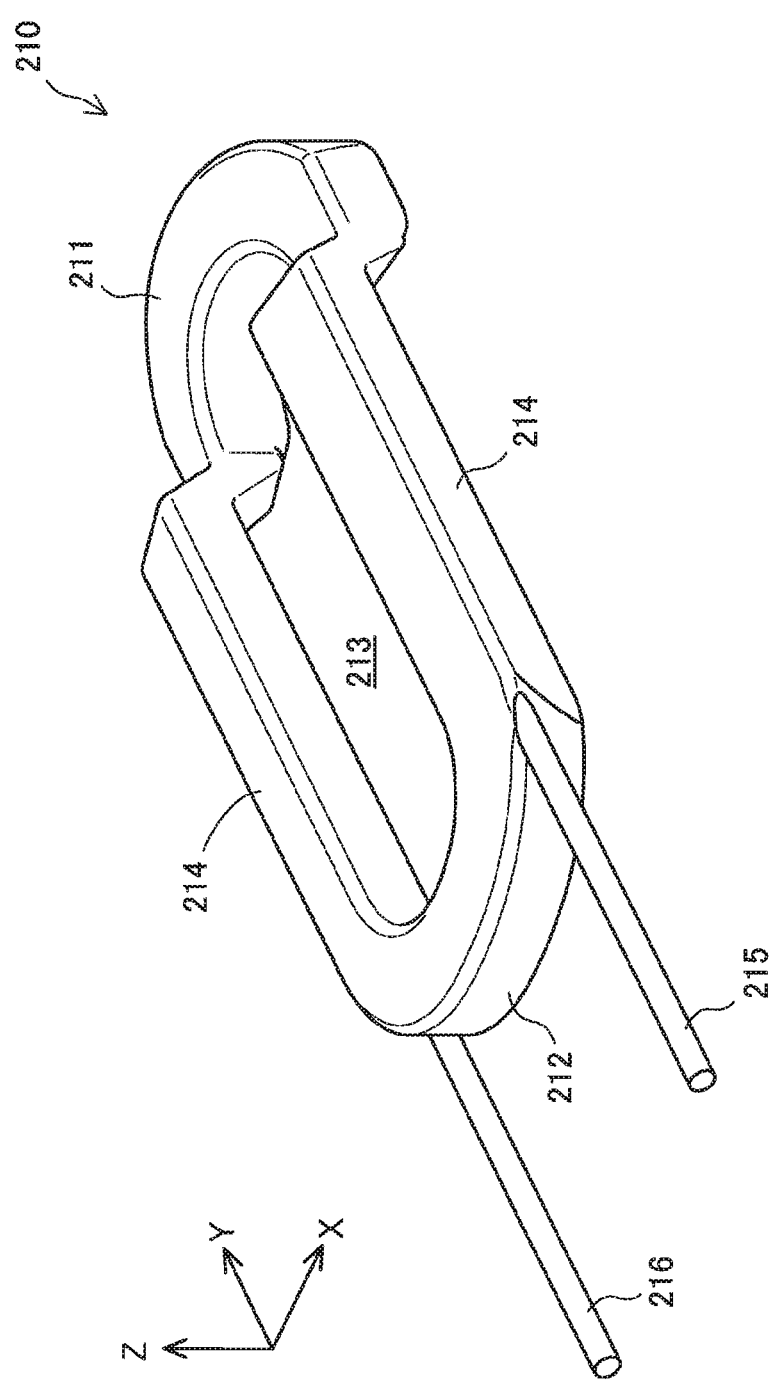

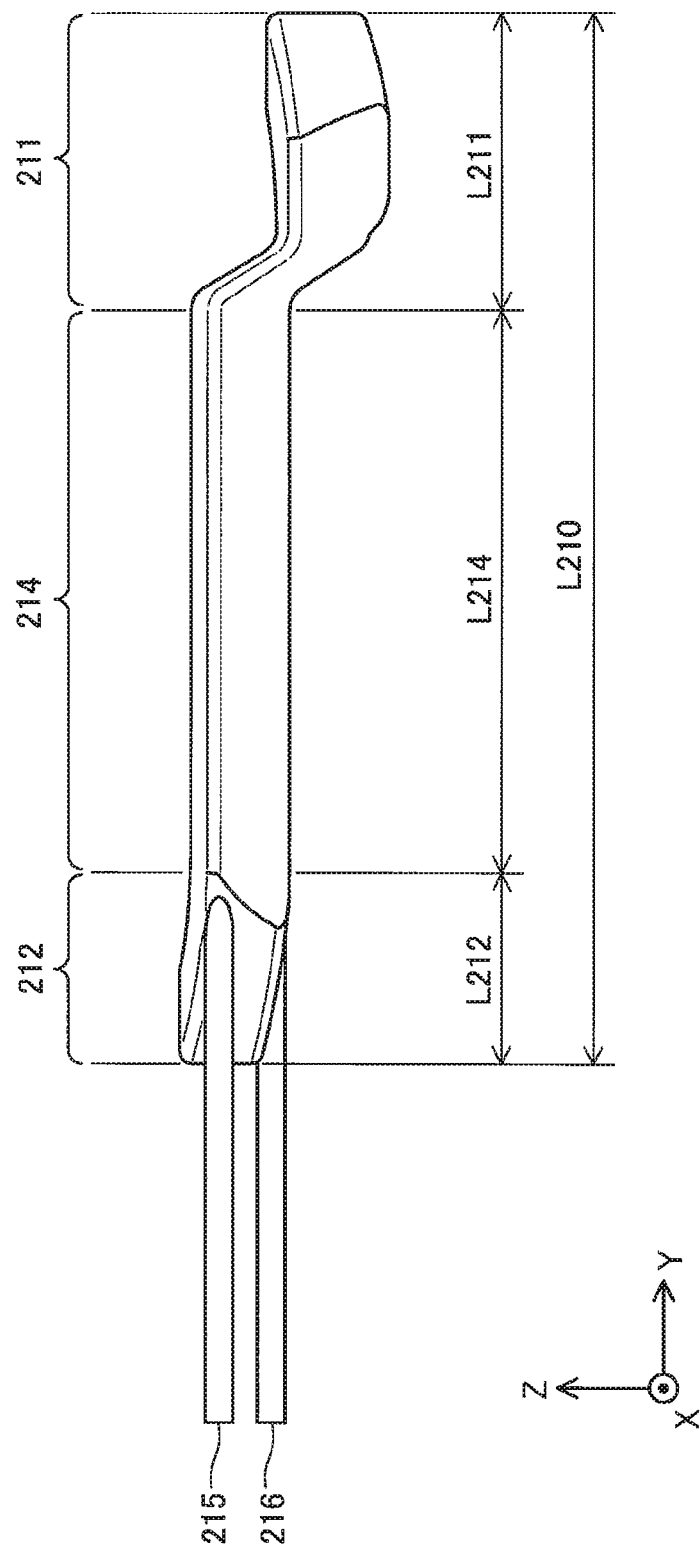

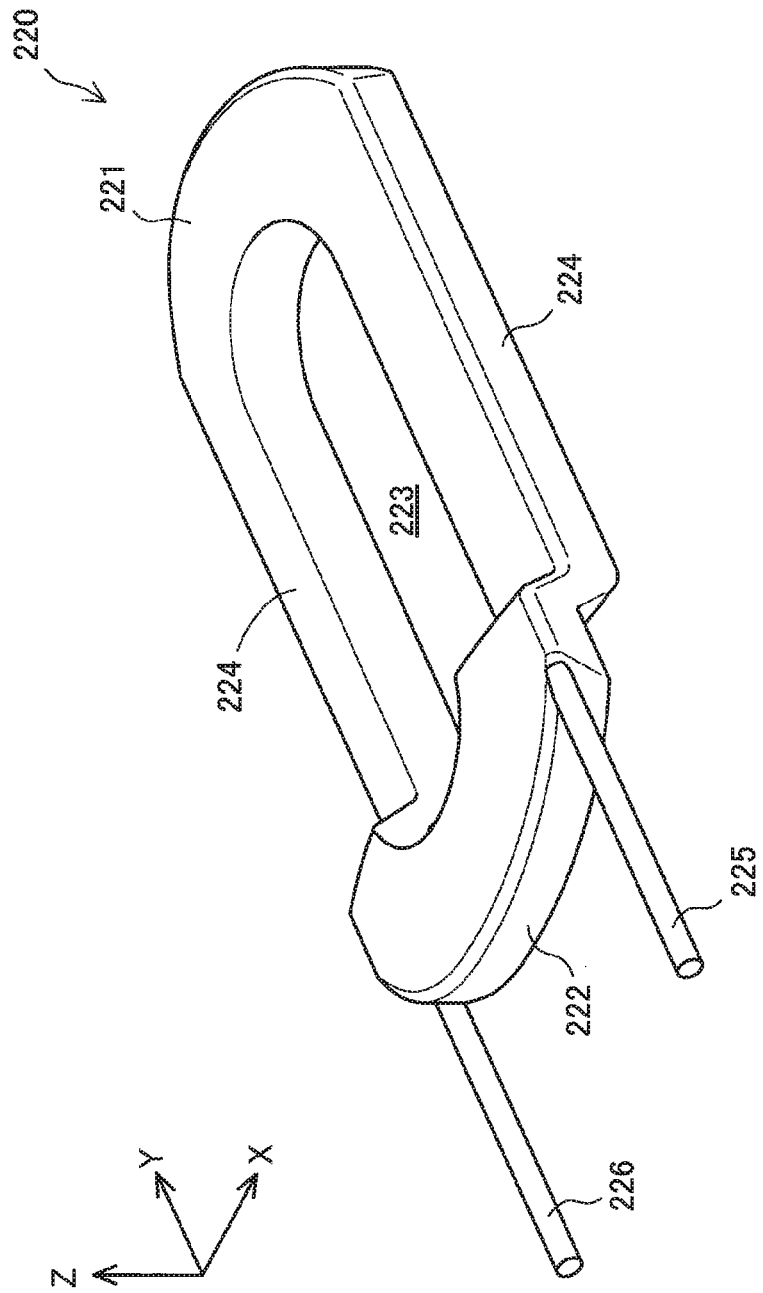

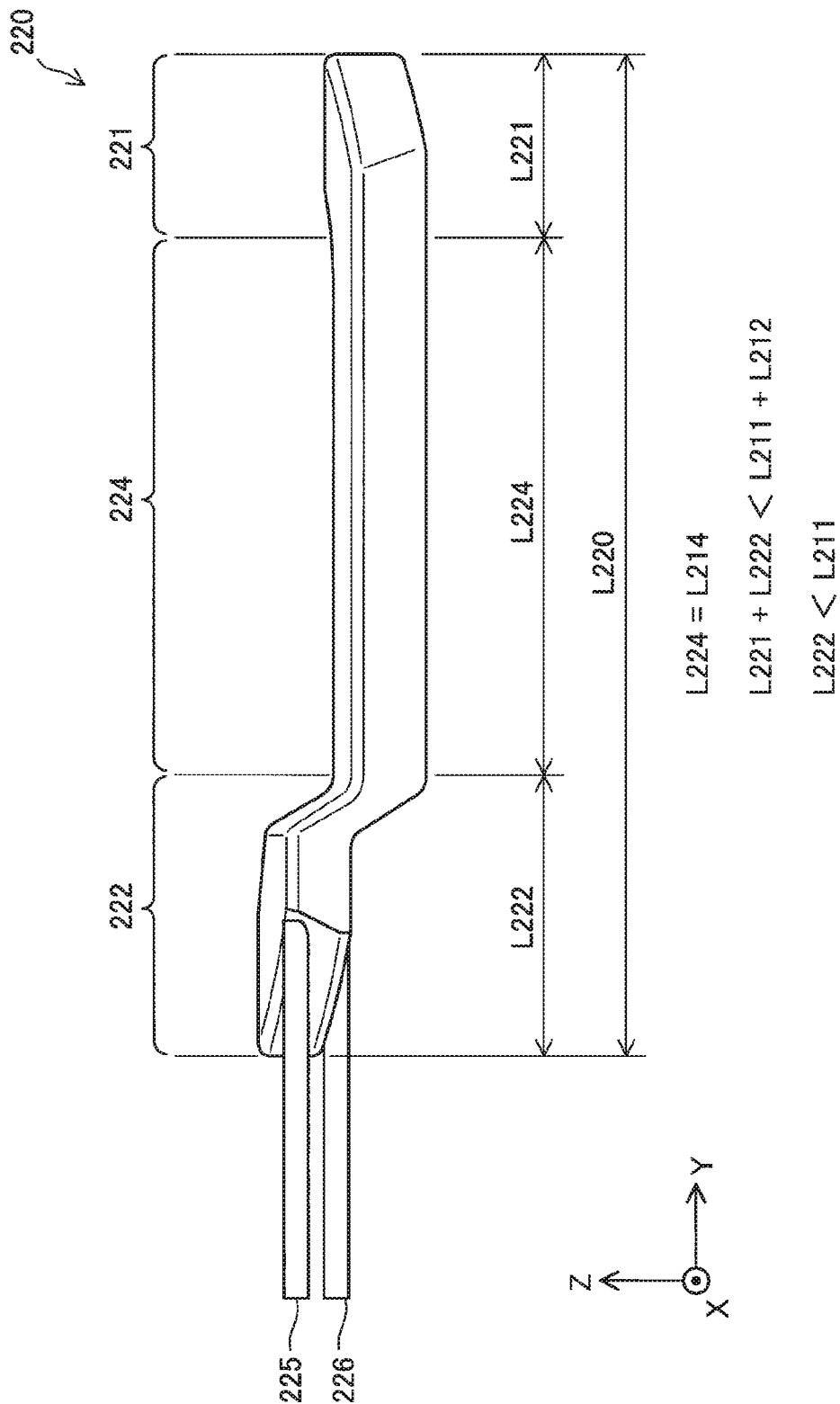

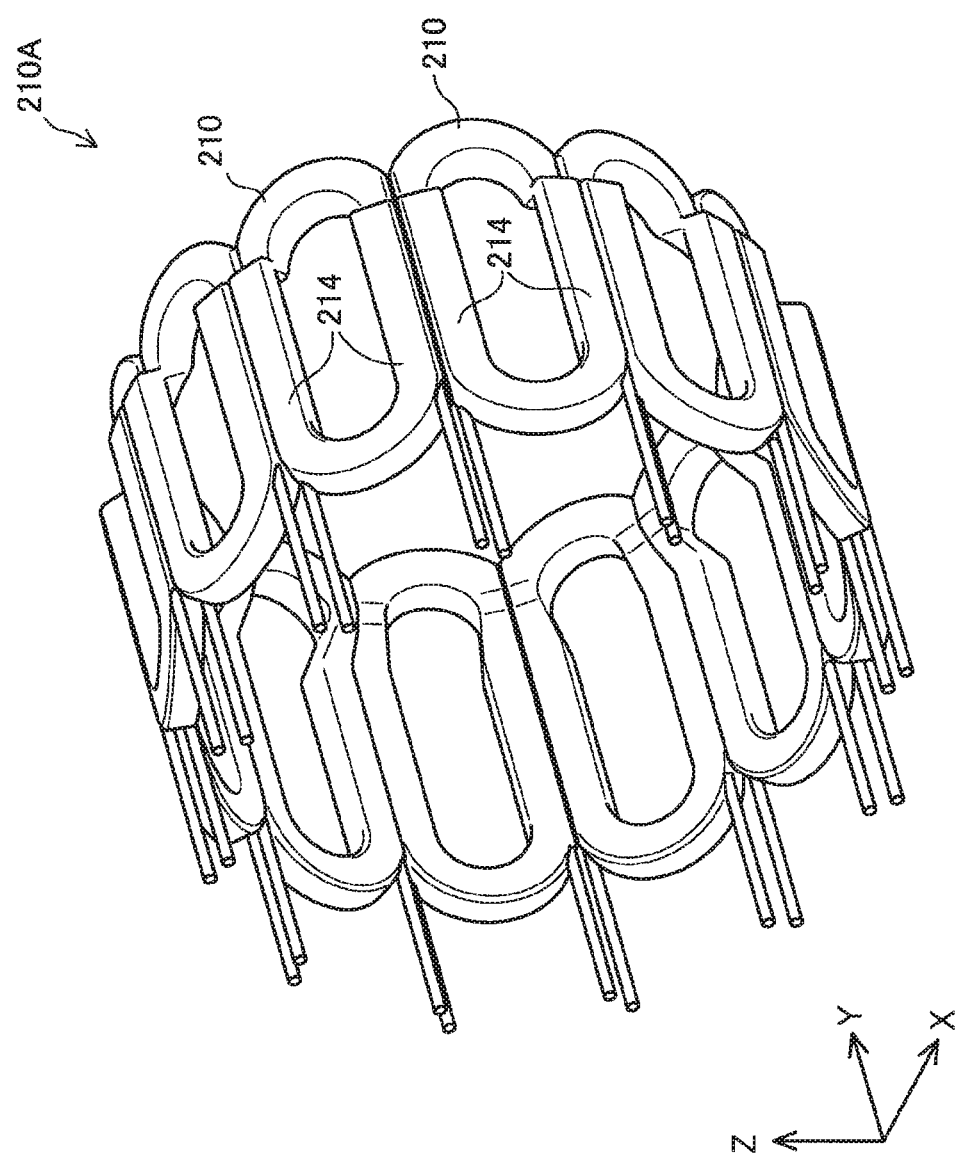

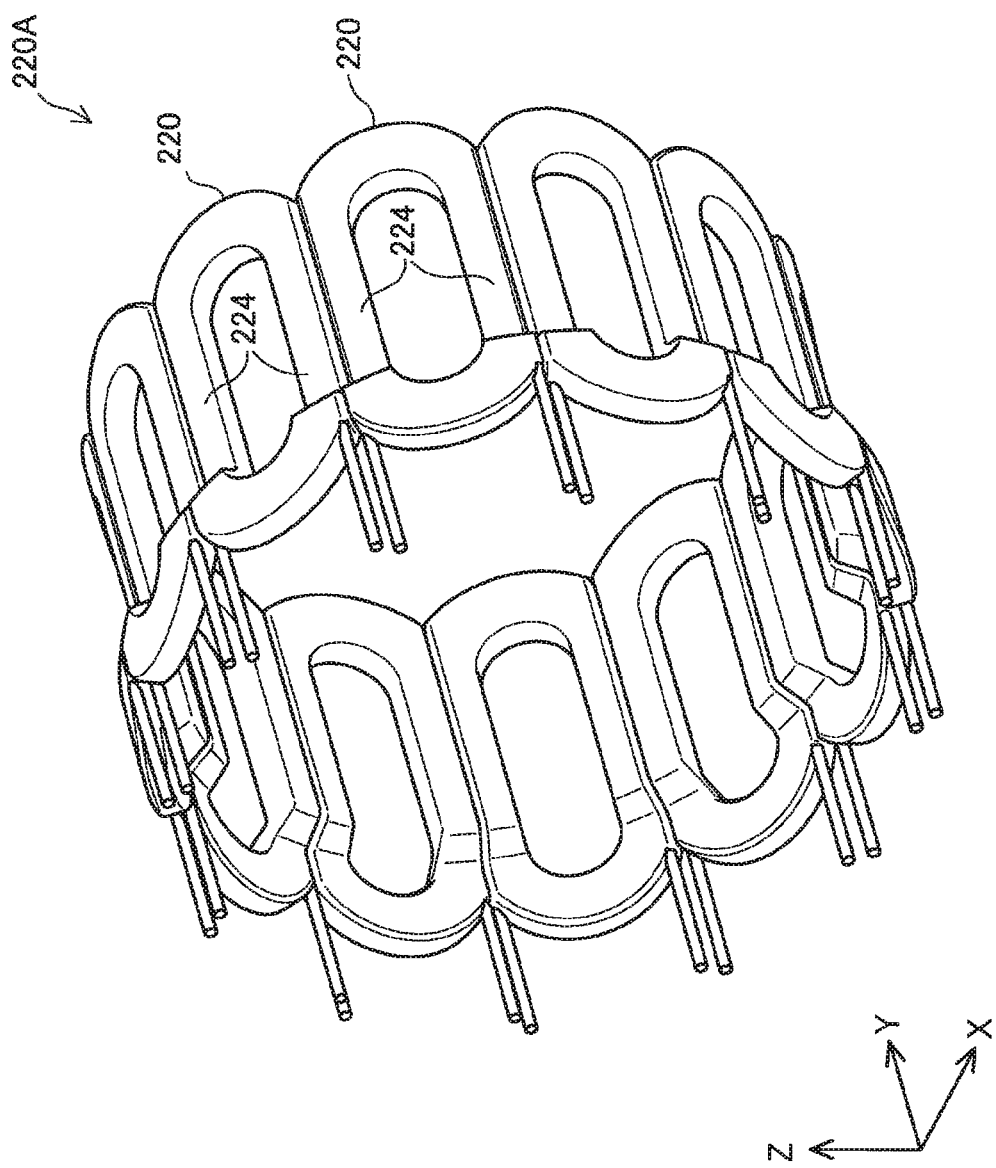

Fig. 11

| SECTIONAL STRUCTURE OF COIL WIRE | BRAIDED STRUCTURE | EDDY CURRENT |
|---|---|---|
| 410 — 412{411, 411}, 414, 416 | NO | ○ |
| 420 — 422{421, 421}, 424, 426 | FLAT BRAIDED — 422 | ◎ |
| 430 — 432{431, 431}, 434, 436, 438 | FLAT BRAIDED — 432 | ○ |

CORELESS ELECTRIC MACHINE WITH MAGNET COILS WITH EFFECTIVE COIL PART AND END COIL PARTS

CROSS REFERENCE TO RELATED APPLICATIONS

The present application claims priority from Japanese patent application No. JP2017-014489 filed on Jan. 30, 2017, and the disclosure of which is hereby incorporated in its entirety by reference into the present application.

BACKGROUND

Field

The present invention relates to a coreless electric machine such as an electric motor or a generator.

Related Art

JP2013-66335A discloses a coreless electric machine which uses a magnet coil (first shape coil) with a first coil end bent toward a permanent magnet, and another magnet coil (second shape coil) with a second coil end bent toward a coil back yoke. This coreless electric machine allows increase in a coil wire density in an effective coil region and reduction in a gap between the permanent magnet and the magnet coils to a minimum, thereby achieving improvement of the efficiency of the coreless electric machine.

According to the foregoing background technique, however, the magnet coils are arranged at positions in intimate contact with each other to cause interference between the magnet coils at an inner position near a rotor. This has caused difficulty in forming a coil assembly including a combination of multiple magnet coils. Additionally, a coil conductive wire to form a magnet coil has encountered localized excessive expansion or a break occurring during formation of the magnet coil.

SUMMARY

The present invention has been made to solve at least one of the foregoing problems, and is feasible in the following aspects.

(1) A first aspect of the present invention is a coreless electric machine comprising: a rotor including a permanent magnet and rotating about a center axis; and a stator with a coil assembly including a combination of 2N magnet coils where N is an integer of two or more, the stator being arranged concentrically with the rotor via a gap from the rotor. Each of the magnet coils is configured as a concentrated winding coil including an effective coil part, a first coil end part and a second coil end part provided on opposite sides of the effective coil part, and an air core region surrounded by the effective coil part, the first coil end part, and the second coil end part. The 2N magnet coils include N first shape coils each having a shape in which the first coil end part is bent inwardly from the effective coil part in a radial direction of the stator, and N second shape coils each having a shape in which the second coil end part is bent outwardly from the effective coil part in the radial direction. The coil assembly has a structure in which (i) the effective coil part of the second shape coil is housed in the air core region of the first shape coil, and the effective coil part of the first shape coil is housed in the air core region of the second shape coil; and (ii) the first shape coils and the second shape coils are arranged alternately, one by one. The outer shape of each of the magnet coils in a section perpendicular to the center axis is a divided ring-like shape defined by dividing a circular ring into equal N parts, and two sides of the divided ring-like shape form an angle set to be $360°/N$ or less. Each of the magnet coils is made of a coil conductive wire including a conductive wire bundle as a bundle of multiple non-insulated conductive wires each being a non-insulated wire, and an insulating coating layer covering periphery of the conductive wire bundle.

According to the coreless electric machine of the foregoing first aspect, the outer shape of each of the magnet coils in the section perpendicular to the center axis is a divided ring-like shape defined by dividing a circular ring into equal N parts, and two sides of the divided ring-like shape form an angle set to be $360°/N$ or less. This prevents interference between the magnet coils at an inner position near the rotor to facilitate formation of the coil assembly by assembling of the multiple magnet coils. Further, each of the magnet coils is made of the coil conductive wire including the conductive wire bundle as a bundle of the multiple non-insulated conductive wires each being a non-insulated wire, and the insulating coating layer covering the periphery of the conductive wire bundle. This makes it possible to reduce the occurrence of localized excessive expansion or a break of the magnet coil.

(2) A second aspect of the present invention is a coreless electric machine comprising: a rotor including a permanent magnet and rotating about a center axis; and a stator with a coil assembly including a combination of 2N magnet coils where N is an integer of two or more, the stator being arranged concentrically with the rotor via a gap from the rotor. Each of the magnet coils is configured as a concentrated winding coil including an effective coil part, a first coil end part and a second coil end part provided on opposite sides of the effective coil part, and an air core region surrounded by the effective coil part, the first coil end part, and the second coil end part. The 2N magnet coils include N first shape coils each having a shape in which the first coil end part is bent inwardly from the effective coil part in a radial direction of the stator, and N second shape coils each having a shape in which the second coil end part is bent outwardly from the effective coil part in the radial direction. The coil assembly has a structure in which (i) the effective coil part of the second shape coil is housed in the air core region of the first shape coil, and the effective coil part of the first shape coil is housed in the air core region of the second shape coil; and (ii) the first shape coils and the second shape coils are arranged alternately, one by one. The outer shape of each of the magnet coils in a section perpendicular to the center axis is a divided ring-like shape defined by dividing a circular ring into equal N parts, and two sides of the divided ring-like shape form an angle set to be $360°/N$ or less.

According to the coreless electric machine of the foregoing second aspect, the outer shape of each of the magnet coils in the section perpendicular to the center axis is a divided ring-like shape defined by dividing a circular ring into equal N parts, and two sides of the divided ring-like shape form an angle set to be $360°/N$ or less. This prevents interference between the magnet coils at an inner position near the rotor to facilitate formation of the coil assembly by assembling of the multiple magnet coils.

(3) In the coreless electric machine of each of the above aspects, a total length of the first coil end part and the second coil end part of each of the first shape coils along the center axis may be greater than a total length of the first coil end part and the second coil end part of each of the second shape coils along the center axis.

According to this coreless electric machine, a total length of the coil end parts along the center axis of the rotor is greater in the first shape coil with the inwardly bent first coil end part than in the second shape coil with the outwardly bent second coil end part. This facilitates setting of an equal length of coil conductive wires for the first shape coil and the second shape coil. This easily achieves equal electrical resistance at the first shape coil and the second shape coil, allowing reduction in the occurrence of torque ripple or the occurrence of vibration resulting from a difference in electrical resistance between the magnet coils.

(4) In the coreless electric machine, the length of the first coil end part of each of the first shape coils along the center axis may be greater than the length of the second coil end part of each of the second shape coils along the center axis.

This coreless electric machine further facilitates setting of an equal length of coil conductive wires for the first shape coil and the second shape coil.

(5) In the coreless electric machine, an array of a coil conductive wire in each of the magnet coils in a section perpendicular to the center axis may include multiple layers stacked in the radial direction, and the number of turns of the coil conductive wire in each of the multiple layers may be set in such a manner that the number of turns of the coil conductive wire increases monotonously in a more external layer in the radial direction.

According to this coreless electric machine, the number of turns in each of the layers is set in such a manner that the number of turns increases monotonously in a more external layer in the radial direction. This facilitates formation of a magnet coil having a divided ring-like shape in which two sides form an angle of 360°/N or less.

(6) A third aspect of the present invention is a coil conductive wire used for forming a magnet coil of a coreless electric machine. The coil conductive wire comprises a conductive wire bundle as a bundle of multiple non-insulated conductive wires each being a non-insulated wire, and an insulating coating layer covering periphery of the conductive wire bundle.

The coil conductive wire of the foregoing third aspect includes the conductive wire bundle as a bundle of the multiple non-insulated conductive wires each being a non-insulated wire, and the insulating coating layer covering the periphery of the conductive wire bundle. This makes it possible to reduce the occurrence of localized excessive expansion or a break of the magnet coil.

(7) In the coil conductive wire, the conductive wire bundle may be braided.

According to this coil conductive wire, the conductive wire bundle as a bundle of the non-insulated conductive wires is braided to achieve improvement of the stretching properties of the coil conductive wire. As a result, it becomes possible to further reduce the occurrence of localized excessive expansion or a break of a magnet coil when the magnet coil is formed by winding the coil conductive wire. Further, braiding the conductive wire bundle makes it possible to reduce an eddy current to be generated when the permanent magnet passes through the vicinity of the coil conducive wire.

(8) In the coil conductive wire, each of the non-insulated conductive wires may be a non-plated copper wire.

According to this coil conductive wire, a non-plated copper wire is used as the non-insulated conductive wire to allow further reduction in an eddy current.

(9) A fourth aspect of the present invention is an electric machine to make linear motion, comprising a magnet coil formed using the foregoing coil conductive wire.

The electric machine of the foregoing fourth aspect achieves an electric machine to make linear motion insusceptible to a break.

(10) A fifth aspect of the present invention is a method of manufacturing the coreless electric machine according to the first aspect or the second aspect. The method comprises the steps of: (a) preparing the N first shape coils and the N second shape coils; (b) forming the coil assembly by assembling the N first shape coils and the N second shape coils; and (c) mounting the coil assembly and the rotor on a casing. The step (a) includes the steps of: forming each of the first shape coils into a shape in which the first coil end part of the first shape coil is bent inwardly from the effective coil part in the radial direction, and forming the outer shape of the first shape coil in the section perpendicular to a center axis of the rotor into the divided ring-like shape; and forming each of the second shape coils into a shape in which the second coil end part of the second shape coil is bent outwardly from the effective coil part in the radial direction, and forming the outer shape of the second shape coil in the section perpendicular to the center axis of the rotor into the divided ring-like shape.

According to the manufacturing method of the foregoing fifth aspect, the outer shape of the first shape coil and that of the second shape coil are each formed into the foregoing divided ring-like shape in the section perpendicular to the center axis of the rotor in the step of preparing the first shape coil and the second shape coil. This prevents interference between the magnet coils at an inner position near the rotor to facilitate formation of the coil assembly by assembling of the multiple magnet coils.

(11) A sixth aspect of the present invention is a magnet coil made of a coil conductive wire. The magnet coil comprises: two effective coil parts parallel to each other; and a first coil end part and a second coil end part provided on opposite ends of the effective coil parts. The first coil end part is in the same plane as the effective coil parts, the second coil end part in a different plane from the effective coil parts, and the magnet coil has a divided ring-like shape in a section viewed from a direction parallel to a direction in which the effective coil parts extend.

According to the magnet coil of the foregoing sixth aspect, the magnet coil has the divided ring-like shape in the section viewed from the direction parallel to the direction in which the effective coils extend. This prevents interference between the magnet coils at an inner position near the rotor to facilitate formation of the coil assembly by assembling of the multiple magnet coils.

(12) A seventh aspect of the present invention is a coreless electric machine comprising: a rotor including a permanent magnet and moving along a predetermined movement axis; and a stator with a coil assembly including multiple magnet coils combined along the movement axis. Each of the magnet coils is configured as a concentrated winding coil including an effective coil part, a first coil end part and a second coil end part provided on opposite sides of the effective coil part, and an air core region surrounded by the effective coil part, the first coil end part, and the second coil end part. The magnet coils include a first shape coil having a shape in which the first coil end part is bent from the effective coil part in a direction away from the movement axis, and a second shape coil having a shape in which the second coil end part is bent from the effective coil part in a direction toward the movement axis. The coil assembly has a structure in which (i) the effective coil part of the second shape coil is housed in the air core region of the first shape coil, and the effective coil part of the first shape coil is housed in the air core region of the second shape coil; and (ii) the first shape coil and the second shape coil are arranged alternately, one by one. Each of the magnet coils is made of a coil conductive wire including a conductive wire bundle as a bundle of multiple non-insulated conductive wires each being a non-insulated wire, and an insulating coating layer covering the periphery of the conductive wire bundle.

According to the coreless electric machine of the foregoing seventh aspect, each of the magnet coils is made of the coil conductive wire including the conductive wire bundle as a bundle of the multiple non-insulated conductive wires each being a non-insulated wire, and the insulating coating layer covering the periphery of the conductive wire bundle. This makes it possible to reduce the occurrence of localized excessive expansion or a break of the magnet coil.

BRIEF DESCRIPTION OF THE DRAWINGS

FIG. 5A is a perspective view of a first shape coil;
FIG. 5C is a side view of the first shape coil;
FIG. 6A is a perspective view of a second shape coil;
FIG. 6C is a side view of the second shape coil;
FIG. 7 is a perspective view of a first coil subassembly;
FIG. 8 is a perspective view of a second coil subassembly;
FIG. 11 is an explanatory view showing exemplary structures of coil conductive wires.

DETAILED DESCRIPTION

A. First Embodiment

Figure 1:
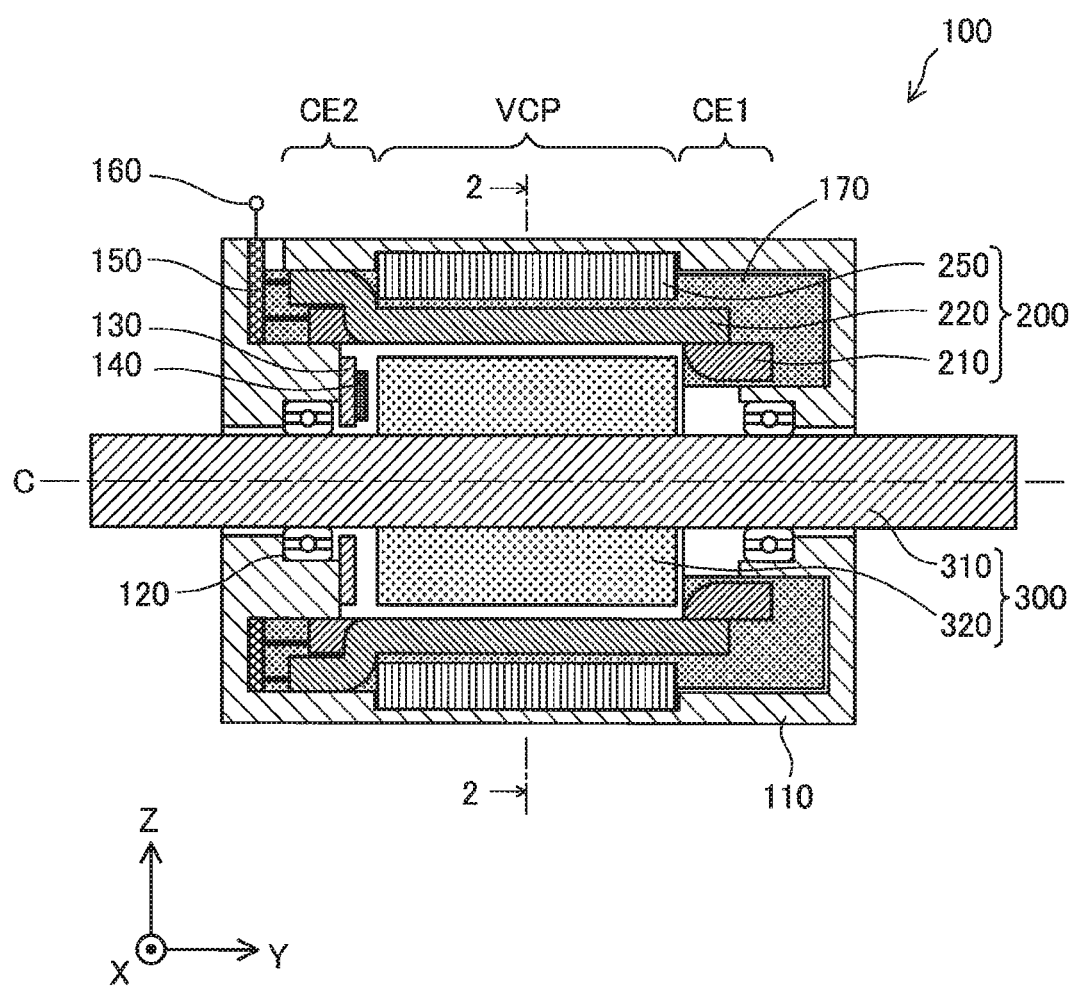
FIG. 1 is a sectional view of a coreless motor according to a first embodiment.
Figure 2:
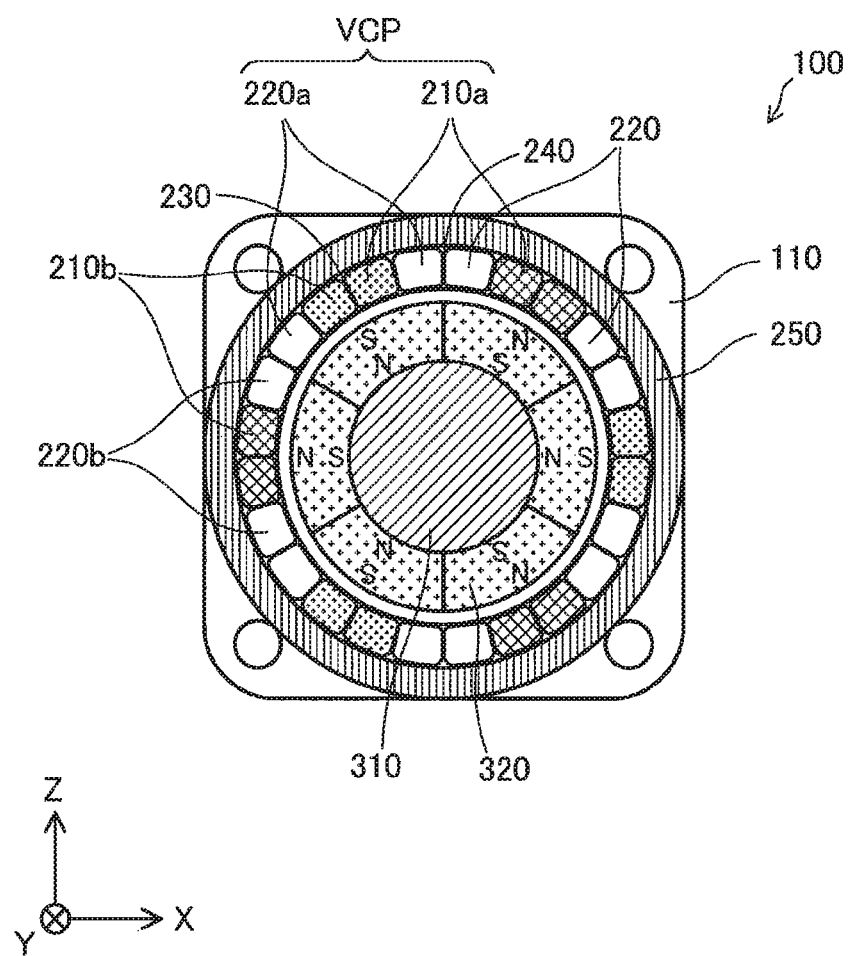
FIG. 2 shows a section 2-2 in an effective coil part VCP shown in FIG. 1.

FIG. 1 is a sectional view of a coreless motor 100 as a coreless electric machine according to a first embodiment. The coreless motor 100 is an inner rotor type motor having a radial gap structure including a casing 110, a stator 200, and a rotor 300. FIG. 1 shows an X direction, a Y direction, and a Z direction orthogonal to each other. The Y direction is a direction parallel to a center axis C of the rotor 300. Where necessary, the X, Y, and Z directions in FIG. 1 are also illustrated in FIG. 2 and subsequent drawings.

The rotor 300 includes a rotor shaft 310 that rotates about the center axis C, and a permanent magnet 320 provided external to the rotor shaft 310. While only one permanent magnet 320 may be provided, two or more permanent magnets 320 are generally provided. Each permanent magnet 320 is magnetized in a radial direction corresponding to an outward direction from the center axis C of the rotor 300. A direction of the magnetization of the permanent magnet 320 is not limited to the radial direction (or radiation direction from the center) but the permanent magnet 320 may be magnetized in a different direction like in parallel magnetization. The "radial direction of the rotor 300" means a direction perpendicular to the center axis C of the rotor 300 and extending outwardly in a radial pattern from the center axis C. The opposite end portions of the rotor shaft 310 are supported by bearings 120 provided at the casing 110.

The stator 200 is housed in the casing 110 and arranged external to the rotor 300 in the radial direction via a gap therebetween. The stator 200 includes a coil back yoke 250 provided inside the casing 110, and multiple magnet coils 210 and 220 provided inside the coil back yoke 250. The magnet coils 210 and 220 include N pieces of first shape coils 210 and N pieces of second shape coils 220. Here, N is an integer of two or more. The first shape coil 210 and the second shape coil 220 have shapes differing from each other. The coil back yoke 250 is made of a magnetic material and has a substantially cylindrical shape. The first shape coil 210 and the second shape coil 220 are molded with resin 170 having excellent heat conductivity, insulating properties, and rigidity. Coil conductive wires of the magnet coils 210 and 220 are each connected to a connecting substrate 150. A coil terminal 160 for power feeding is taken out of the connecting substrate 150 to the outside of the casing 110.

The magnet coils 210 and 220 each include an effective coil part VCP, and a first coil end part CE1 and a second coil end part CE2 provided on opposite sides of the effective coil part VCP. The effective coil part VCP is a coil part for making energy conversion between electrical energy and mechanical energy effectively. The coil end parts CE1 and CE2 are coil parts not directly involved in the energy conversion. In the presence of the coil back yoke 250, a coil part overlapping the coil back yoke 250 in the radial direction corresponds to the effective coil part VCP, and a coil part not overlapping the coil back yoke 250 in the radial direction corresponds to the coil end parts CE1 and CE2. The shape of the first shape coil 210 is such that the first coil end part CE1 is bent inwardly from the effective coil part VCP in the radial direction. The shape of the second shape coil 220 is such that the second coil end part CE2 is bent outwardly from the effective coil part VCP in the radial direction. The connecting substrate 150 is provided adjacent to the second coil end part CE2. The respective shapes of the first shape coil 210 and the second shape coil 220 will be described further later.

The casing 110 includes a magnetic sensor 140 as a position sensor for detecting the rotary position of the rotor 300. The magnetic sensor 140 is connected to a circuit board 130. In this embodiment, the magnetic sensor 140 and the circuit board 130 are arranged on one of the opposite sides of the permanent magnet 320 and on the same side as the second coil end part CE2.

FIG. 2 shows a section 2-2 in the effective coil part VCP shown in FIG. 1. In this section, the respective effective coil parts VCP of the first shape coil 210 and the second shape coil 220 do not overlap in the radial direction but the first shape coil 210 and the second shape coil 220 are arranged alternately, one by one. In this example, the number N of the first shape coils 210 and the number N of the second shape coils 220 are both six. The sections of the first shape coil 210 are hatched in different ways responsive to current directions.

In FIG. 2, two coils 210a and 210b are first shape coils 210, and the effective coil parts VCP of the coils 210a and 210b contacting each other are inserted within a second shape coil 220a, for example. The coils 210a and 210b of the same shape are arranged in intimate contact with each other with a boundary 230 therebetween. The coils 210a and 220a of different shapes are arranged with a boundary 240 therebetween at which a clearance is generated during manufacture of coils.

Figure 3:
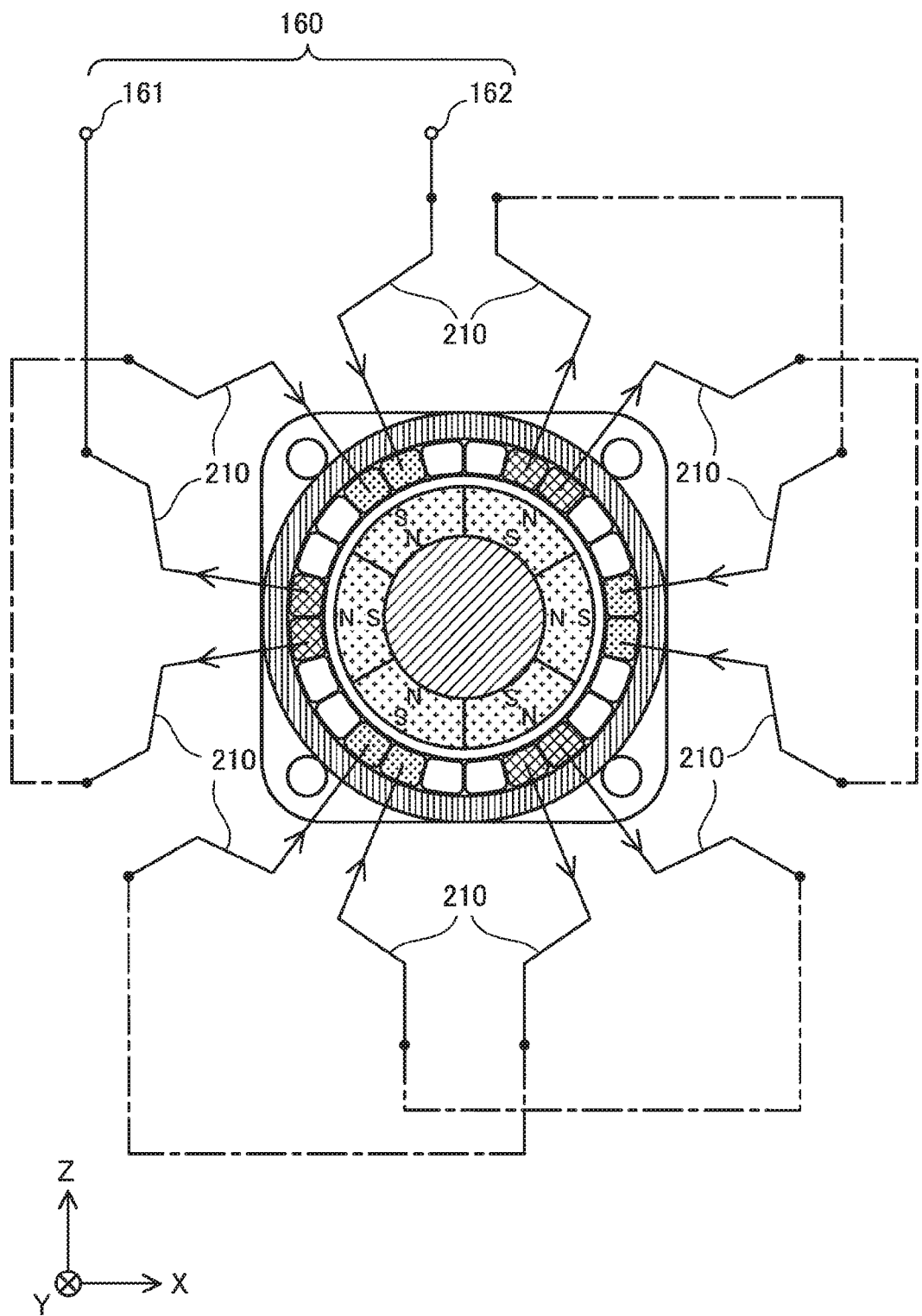
FIG. 3 is an explanatory view showing a connection state of coils corresponding to one phase according to the first embodiment.

FIG. 3 is an explanatory view showing a connection state of the first shape coils 210. FIG. 3 shows only the connection state of the first shape coils 210, and illustration of a connection state of the second shape coils 220 is omitted. Arrows given to coil conductive wires show current directions. Coil winding directions of the first shape coils 210 are alternately reversed (alternation of a clockwise direction and an anticlockwise direction, for example). The multiple first shape coils 210 are connected in such a manner that magnetic fields generated by currents are pointed in alternately reversed directions (alternation of a radially outward direction and a radially inward direction). The multiple first shape coils 210 are connected in sequence, and coil terminals 161 and 162 for power feeding are provided at opposite ends of the connected first shape coils 210. This connection state also applies to the second shape coils 220. Further, arrangement of intimate contact may be employed at a boundary between coils of the same shape, between the first shape coils 210 or between the second shape coils 220. Coils of different shapes may be arranged with a boundary therebetween at which a clearance configured to accommodate error occurring during manufacture of coils is provided. This configuration allows magnetic lines of force of the permanent magnet 320, and the magnet coils 210 and 220 to be laid in ideal arrangement, while achieving motor characteristics to generate highest torque.

Figure 4:
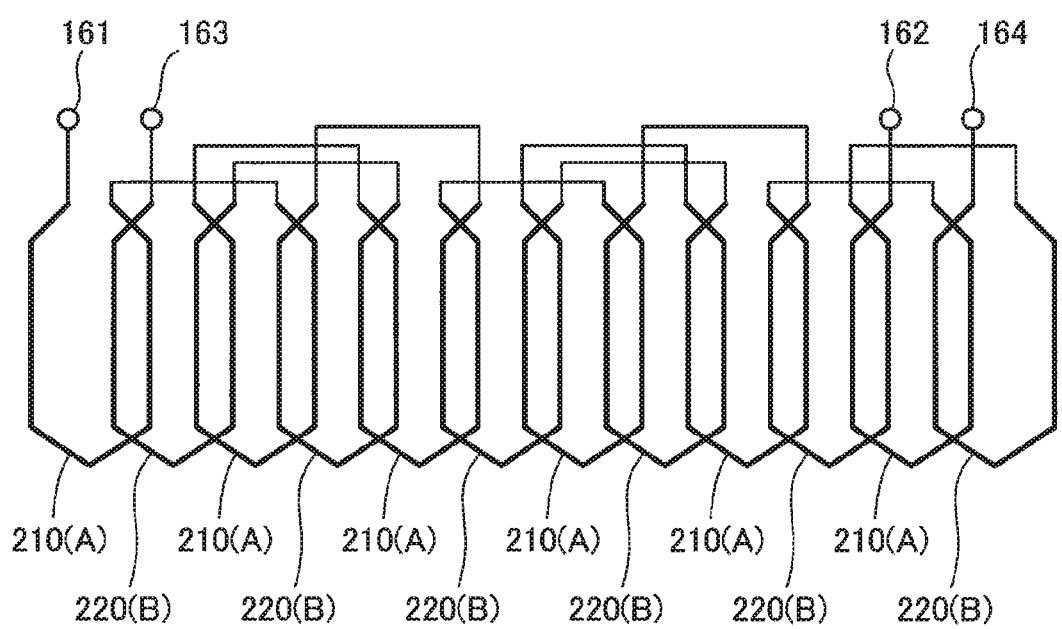
FIG. 4 is an explanatory view showing a connection state of magnet coils according to the first embodiment.

FIG. 4 is an explanatory view showing a connection state of the magnet coils 210 and 220 according to the first embodiment. In the first embodiment, the first shape coils 210 of the number N (N=6) are electrically connected in sequence to form an A phase. Further, the second shape coils 220 of the number N are electrically connected in sequence to form a B phase. In FIG. 4, characters "(A)" and "(B)" added after the signs 210 and 220 respectively of magnet coils show a difference between the A phase and the B phase. The two coil terminals 161 and 162 are provided at the opposite ends of the A-phase coil formed of the N first shape coils 210. Likewise, two coil terminals 163 and 164 are provided at the opposite ends of the B-phase coil formed of the N second shape coils 220. As understood from this explanation, the coreless motor 100 of the first embodiment is configured as a two-phase motor.

Figure 5B:
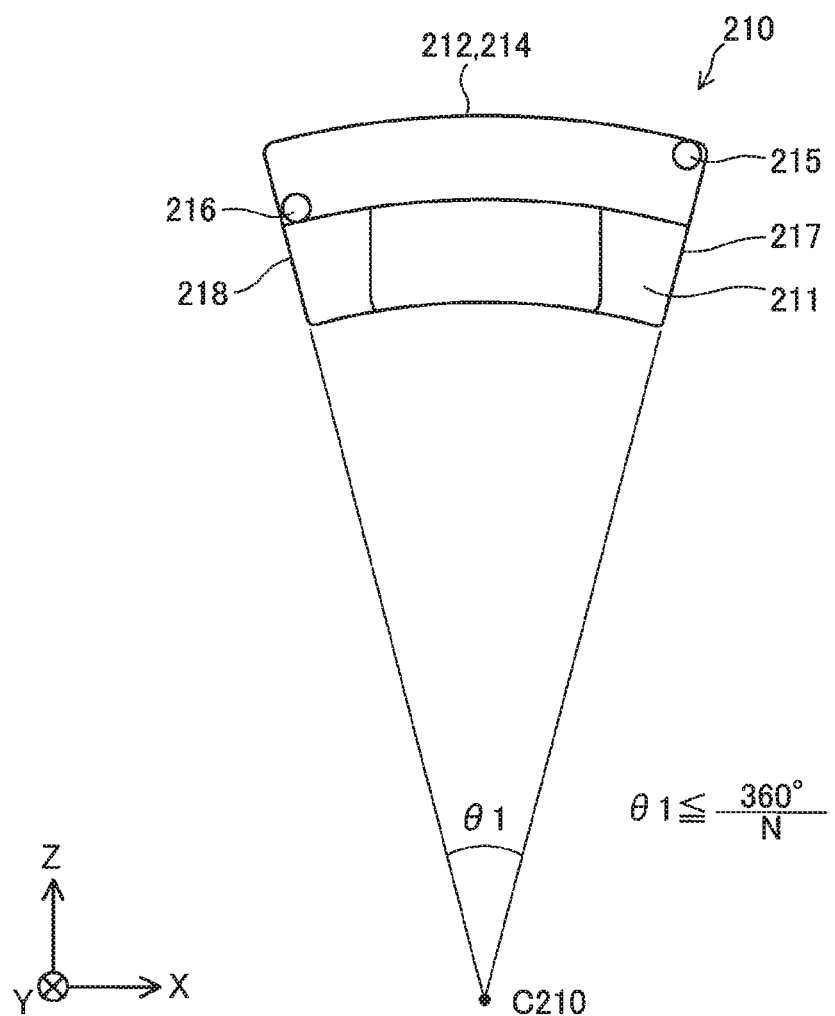
FIG. 5B is a front view of the first shape coil.

FIGS. 5A, 5B, and 5C are a perspective view, a front view, and a side view respectively of the first shape coil 210. The first shape coil 210 is configured as a concentrated winding coil including two effective coil parts 214 parallel to each other, and a first coil end part 211 and a second coil end part 212 provided at opposite sides of the two effective coil parts 214. The effective coil parts 214, the first coil end part 211, and the second coil end part 212 correspond to the effective coil part VCP, the first coil end part CE1, and the second coil end part CE2 respectively shown in FIG. 1. The effective coil parts 214 are two parallel coil parts extending in a direction (Y direction) parallel to the center axis C of the rotor 300. Space surrounded by the effective coil parts 214, the first coil end part 211, and the second coil end part 212 is called an "air core region 213." The shape of the first shape coil 210 is such that the first coil end part 211 is bent from the effective coil parts 214 inwardly in the radial direction into a shape like a Z. An end portion of the first coil end part 211 is bent into an arc-like shape. In this embodiment, the second coil end part 212 is not bent in the radial direction from the effective coil parts 214 but is in the same plane as the effective coil parts 214. An end portion of the second coil end part 212 is bent into an arc-like shape in the same plane as the effective coil parts 214. In other words, the first coil end part 211 is in the same plane as the effective coil parts 214, and the second coil end part 212 is in a different plane from the effective coil parts 214. The first shape coil 210 has two coil ends 215 and 216 taken out from the second coil end part 212. This makes it possible to form a configuration facilitating power feeding to the first shape coil 210.

FIG. 5B shows the outer shape of the first shape coil 210 in a section perpendicular to the center axis C (FIG. 1) of the rotor 300. The outer shape of the first shape coil 210 is a divided ring-like shape defined by dividing a circular ring into equal N parts. In other words, the first shape coil 210 has a divided ring-like shape in a section viewed from a direction parallel to a direction in which the effective coil parts 214 extend. The divided ring-like shape has two sides 217 and 218 tilted to each other and crossing each other at a point of intersection C210 internal to the first shape coil 210 in the radial direction. The point of intersection C210 is preferably defined in the vicinity of the center axis C of the rotor 300, more preferably, on the center axis C. An angle θ1 between the two sides 217 and 218 is set to be 360°/N or less. The shapes shown in FIGS. 5A to 5C are on the assumption that the number N of coils is 12 and the angles θ1 are uniformly set to 30°, for example.

As shown in FIG. 5C, the first shape coil 210 has a length L210 extending in the direction (Y direction) parallel to the center axis C of the rotor 300. The effective coil parts 214, the first coil end part 211, and the second coil end part 212 have a length L214, a length L211, and a length L212 respectively. These lengths will be described further later.

Figure 6B:
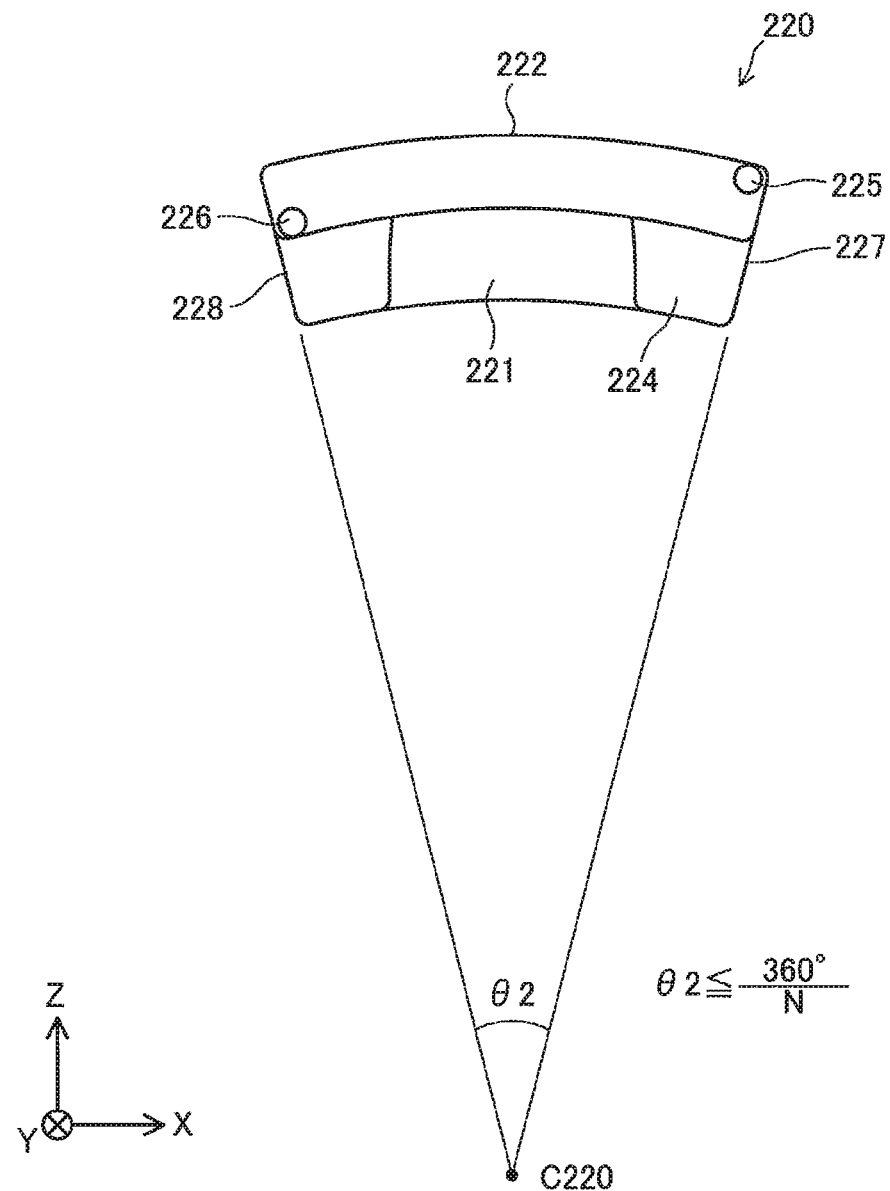
FIG. 6B is a front view of the second shape coil.

FIGS. 6A, 6B, and 6C are a perspective view, a front view, and a side view respectively of the second shape coil 220. The second shape coil 220 has substantially the same structure as the first shape coil 210, except that the second coil end part is bent in the radial direction instead of the first coil end part. More specifically, the second shape coil 220 is configured as a concentrated winding coil including effective coil parts 224, and a first coil end part 221 and a second coil end part 222 provided at opposite sides of the effective coil parts 224. Space surrounded by the effective coil parts 224, the first coil end part 221, and the second coil end part 222 is called an "air core region 223." Regarding the second shape coil 220, the first coil end part 221 is not bent in the radial direction from the effective coil parts 224 but is in the same plane as the effective coil parts 224. An end portion of the first coil end part 221 is bent into an arc-like shape in the same plane as the effective coil parts 224. The second coil end part 222 has a shape bent from the effective coil parts 224 outwardly in the radial direction into a shape like a Z. An end portion of the second coil end part 222 is bent into an arc-like shape. Like the first shape coil 210, the second shape coil 220 has two coil ends 225 and 226 taken out from the second coil end part 222.

FIG. 6B shows the outer shape of the second shape coil 220 in a section perpendicular to the center axis C (FIG. 1) of the rotor 300. Like that of the first shape coil 210, the outer shape of the second shape coil 220 is a divided ring-like shape defined by dividing a circular ring into equal N parts. The divided ring-like shape has two sides 227 and 228 tilted to each other and crossing each other at a point of intersection C220 internal to the second shape coil 220 in the radial direction. The point of intersection C220 is preferably defined in the vicinity of the center axis C of the rotor 300, more preferably, on the center axis C. An angle θ2 between the two sides 227 and 228 is set to be 360°/N or less. The shapes shown in FIGS. 6A to 6C are on the assumption that the number N of coils is 12 and the angles θ2 are uniformly set to 30°, for example.

As shown in FIG. 6C, the second shape coil 220 has a length L220 extending in the direction (Y direction) parallel to the center axis C of the rotor 300. The effective coil parts 224, the first coil end part 221, and the second coil end part 222 have a length L224, a length L221, and a length L222 respectively.

The length L214 of the effective coil parts 214 of the first shape coil 210 is equal to the length L224 of the effective coil parts 224 of the second shape coil 220. In this embodiment, a total length (L211+L212) of the first coil end part 211 and the second coil end part 212 of the first shape coil 210 is set to be greater than a total length (L221+L222) of the first coil end part 221 and the second coil end part 222 of the second shape coil 220. This setting is for the following reason. As described above, the shape of the first shape coil 210 is such that the first coil end part 211 is bent inwardly and the shape of the second shape coil 220 is such that the second coil end part 222 is bent outwardly. Hence, if the lengths (L211+L212) and (L221+L222) are set to be equal to each other, it is likely that the length of a coil conductive wire (coil length) will be shorter at the first shape coil 210 having the shape with the inwardly bent first coil end part 211 than at the second shape coil 220 having the shape with the outwardly bent second coil end part 222. The length of a coil conductive wire differing between the first shape coil 210 and the second shape coil 220 would unfortunately cause a difference in electrical resistance between the first shape coil and the second shape coil. The difference in electrical resistance between the magnet coils causes the problem of torque ripple or vibration. By contrast, establishing the relationship of (L221+L222)<(L211+L212) like in this embodiment facilitates setting of an equal length of coil conductive wires for the first shape coil 210 and the second shape coil 220. This easily achieves equal electrical resistance at the first shape coil 210 and the second shape coil 220, allowing reduction in the occurrence of torque ripple or the occurrence of vibration resulting from a difference in electrical resistance between the magnet coils.

It is more preferable that the length L211 of the first coil end part 211 of the first shape coil 210 be greater than the length L222 of the second coil end part 222 of the second shape coil 220. This further facilitates setting of an equal length of coil conductive wires for the first shape coil 210 and the second shape coil 220.

FIG. 7 is a perspective view of a first coil subassembly 210A formed by arranging the first shape coils 210 shown in FIGS. 5A to 5C in a cylindrical pattern. The first coil subassembly 210A may be formed by arranging N first shape coils 210 in a ringlike pattern with outer side surfaces of the effective coil parts 214 of adjacent ones of the first shape coils 210 contacting each other, and bonding the N first shape coils 210 to each other.

FIG. 8 is a perspective view of a second coil subassembly 220A formed by arranging the second shape coils 220 shown in FIGS. 6A to 6C in a cylindrical pattern. The second coil subassembly 220A may be formed by arranging N second shape coils 220 in a ring-like pattern with outer side surfaces of the effective coil parts 224 of adjacent ones of the second shape coils 220 contacting each other, and bonding the N second shape coils 220 to each other.

Figure 9:
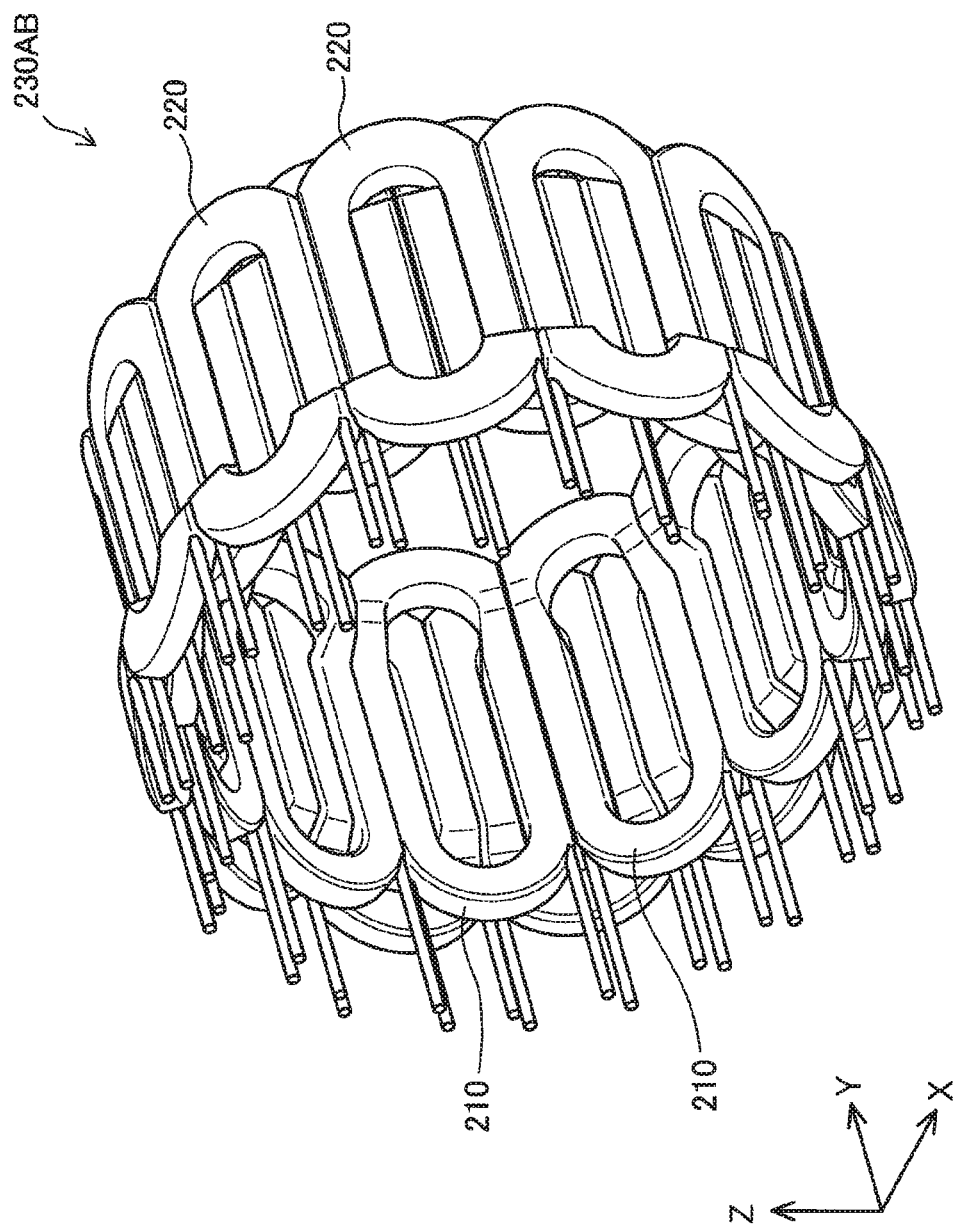
FIG. 9 is a perspective view of a coil assembly.

FIG. 9 is a perspective view of a coil assembly 230AB formed by assembling the first coil subassembly 210A and the second coil subassembly 220A. The coil assembly 230AB may be assembled by sliding the second coil subassembly 220A (FIG. 8) into the first coil subassembly 210A (FIG. 7) from right to left. In this case, intimate contact is employed at a boundary (230 in FIG. 2) between coils of the same shape, so that the coils of the same shape are bonded tightly to each other. Further, since a clearance is provided at a boundary (240 in FIG. 2) between coils of different shapes, it reduces frictional resistance when the coil assemblies 210A and 220A are assembled by sliding to facilitate the sliding. Meanwhile, the coil assembly 230AB may be assembled in different methods. For example, after the first coil subassembly 210A is assembled, the second shape coils 220 may be mounted in sequence, one by one, on the first coil subassembly 210A.

The coil assembly 230AB has a structure in which the first shape coils 210 and the second shape coils 220 are arranged alternately, one by one, and has the following features.

(i) The effective coil part 224 of the second shape coil 220 is housed in the air core region 213 (FIG. 5A) of the first shape coil 210, and the effective coil part 214 of the first shape coil 210 is housed in the air core region 223 (FIG. 6A) of the second shape coil 220.

(ii) The first shape coil 210 and the second shape coil 220 are arranged in such a manner that the first coil end part 211 of the first shape coil 210 and the first coil end part 221 of the second shape coil 220 overlap each other in the radial direction, and the second coil end part 212 of the first shape coil 210 and the second coil end part 222 of the second shape coil 220 overlap each other in the radial direction.

As understood from FIG. 9, the first shape coils 210 and the second shape coils 220 are arranged such that the respective effective coil parts 214 and 224 contact each other with substantially no clearance therebetween. This makes it possible to increase a coil wire density of the coil assembly 230AB to an extremely high level. The coreless motor 100 shown in FIG. 1 may be manufactured by following a manufacturing method including a step of mounting the coil assembly 230AB and the rotor 300 on the casing 110.

As explained by referring to FIG. 5B, the shape of the first shape coil 210 is such that the outer shape of the first shape coil 210 in a section perpendicular to the center axis C of the rotor 300 is a divided ring-like shape defined by dividing a circular ring into equal N parts, and the angle θ1 between the two sides 217 and 218 of the divided ring-like shape is set to be 360°/N or less. This also applies to the second shape coil 220 (FIG. 6B). Thus, this prevents interference between the magnet coils 210 and 220 at an inner position near the rotor 300 to facilitate formation of the coil assembly 230AB by assembling of the multiple magnet coils 210 and 220. The shapes of the magnet coils 210 and 220 shown in FIGS. 5B and 6B respectively are preferably formed during preparation of the individual magnet coil 210 and the individual magnet coil 220 before assembling of the coil assembly 230AB and assembling of the coil subassemblies 210A and 220A. By doing so, the coil assembly 230AB, and the coil subassemblies 210A and 220A may be assembled easily.

Figure 10A:
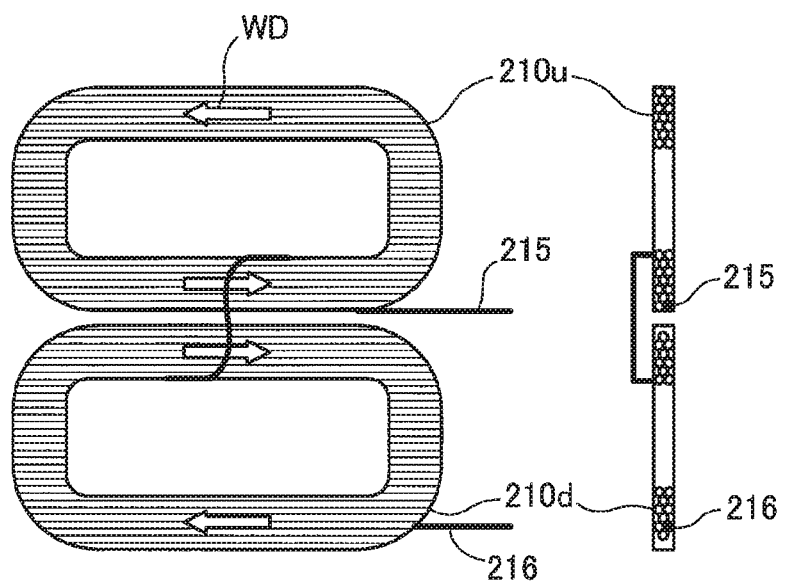
FIG. 10A is an explanatory view showing a step of forming the first shape coil.
Figure 10B:
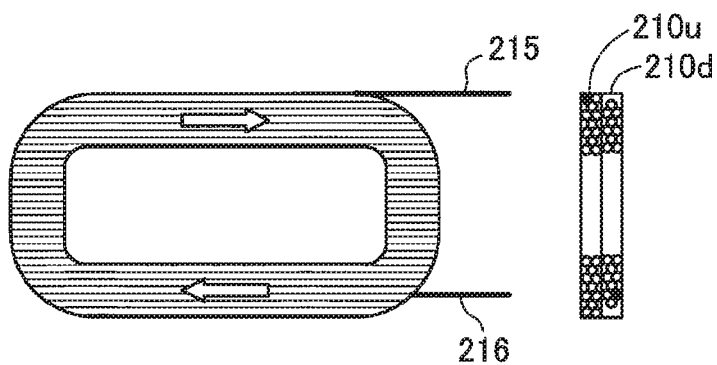
FIG. 10B is an explanatory view showing a step of forming the first shape coil.
Figure 10C:
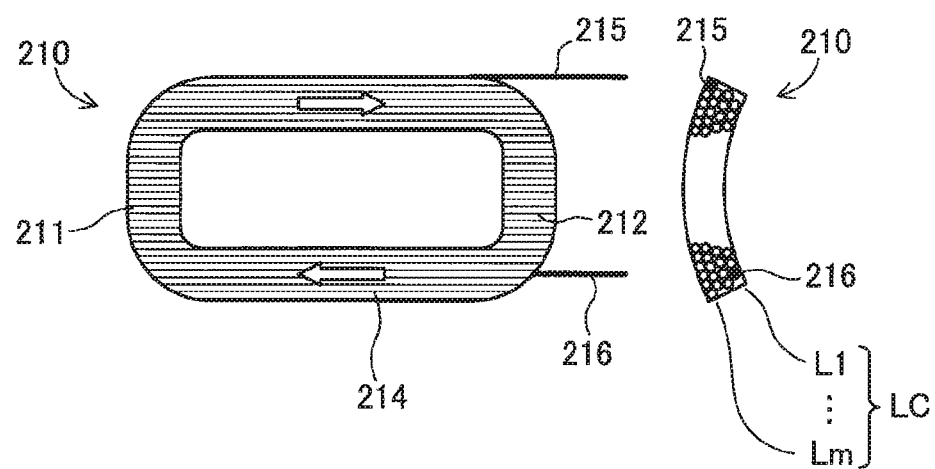
FIG. 10C is an explanatory view showing a step of forming the first shape coil.

FIGS. 10A to 10C are explanatory views showing steps of forming the first shape coil 210. First, in the step shown in FIG. 10A, a coil conductive wire is prepared, and the coil conductive wire is wound externally at both of opposite end sections from a substantially center position according to a winding to form two coil parts 210u and 210d from the single coil conductive wire. Arrows in the drawing show a winding direction WD. The left part of FIG. 10A is a plan view, and the right part of FIG. 10A is a sectional view of an effective coil part. The coil ends 215 and 216 project externally from the two coil parts 210u and 210d respectively. Next, in the step shown in FIG. 10B, the two coil parts 210u and 210d are superimposed on each other at positions facing each other to form the first shape coil 210 having a planar shape. Arrows in the drawing show a current direction determined when a current flows out from the coil end 215. Next, in the step shown in FIG. 10C, the planar first shape coil 210 is subjected to bending process. In this bending step, the effective coil part 214 and the second coil end part 212 of the first shape coil 210 are bent into the divided ring-like shape shown in FIG. 5B, and the first coil end part 211 is bent into the shape like a Z as shown in FIG. 5A. While the coil parts 210u and 210d are described as having an equal number of stacked wire layers, the number of stacked wire layers is not required to be equal but may be different between the coil parts 210u and 210d. For example, one coil part 210u may have a one-layer structure, and the other coil part 210d may have a four-layer structure.

As shown in the right part of FIG. 10C, as viewed in a section of the effective coil part 214 along a section perpendicular to the center axis C of the rotor 300, an array LC of the coil conductive wire preferably includes multiple layers L1 to Lm (m is an integer of two or more) stacked in the radial direction. Among the multiple layers L1 to Lm, the layer L1 is the innermost layer and the layer Lm is the outermost layer viewed in the radial direction of the rotor 300. In this case, the number of turns of the coil conductive wire in each of the multiple layers L1 to Lm is preferably set in such a manner that the number of turns increases monotonously in a more external layer in the radial direction. In particular, among the multiple layers L1 to Lm, it is preferable that the number of turns of the coil conductive wire be set to be greater in a more external layer in the radial direction. Meanwhile, the numbers of turns of the coil conductive wire may be equal in adjacent two layers in some of the multiple layers L1 to Lm. This facilitates formation of a magnet coil having a divided ring-like shape in which two sides form an angle of 360°/N or less. The second shape coil 220 may be formed into the substantially same structure as the first shape coil 210 until the coil shown in FIG. 10B is formed according to a winding, and is manufactured with excellent productivity.

FIG. 11 is an explanatory view showing exemplary structures of coil conductive wires used for forming magnet coils. A first coil conductive wire 410 shown in the upper row of FIG. 11 includes a conductive wire bundle 412 as a bundle of multiple non-insulated conductive wires 411 each being a non-insulated wire, and an insulating coating layer 414 covering the periphery of the conductive wire bundle 412. The insulating properties of the insulating coating layer 414 are only required to withstand an induced voltage generated in one turn of the coil conductive wire 410 of the magnet coil. A second insulating covering described later functions to ensure insulating properties for withstanding potential differences occurring between coils and between phases. Thus, the insulating coating layer 414 may be thinner than the second insulating covering. The non-insulated conductive wire 411 is a bare copper wire, for example. A self-welding layer 416 is formed around the insulating coating layer 414. The self-welding layer 416 is activated with heat or a solvent to fulfill the function of welding adjacent coil conductive wires 410 to each other. The self-welding layer 416 is omissible. The conductive wire bundle 412 is not braided. While the coil conductive wire 410 has a circular shape in a section, it may be formed into a substantially rectangular shape in a section.

An enamel wire commonly used as a coil conductive wire is formed of conductive wires each insulated by an insulating covering. This causes a problem that a relatively large eddy current is generated in a magnet coil when the permanent magnet 320 passes through the vicinity of the magnet coil. The eddy current is generated in a direction which prohibits positional change of the permanent magnet 320 relative to the coil, thereby causing resistance against rotation of a coreless motor. Hence, the eddy current is required to be reduced. The eddy current was examined by experiment conducted by moving a permanent magnet so as to pass the permanent magnet through a position in the vicinity of a surface of the coil conductive wire 410 placed in a linear pattern, and measuring force generated at the coil conductive wire 410 during the movement. In this case, the force generated at the coil conductive wire 410 is assumable to be proportionate to the magnitude of the eddy current generated at the coil conductive wire 410. A Litz wire (a wire with enamel wires twisted together) is usable for reducing the eddy current, for example. The Litz wire as a whole has a sectional area sufficient for ensuring a current quantity to flow through the coil and is used suitably as the coil conductive wire 410. At the same time, the sectional area of each enamel wire forming the Litz wire is sufficiently small to allow reduction in the occurrence of the eddy current. Additionally, the Litz wire is quite easily available. However, the present inventor found that using the Litz wire as the coil conductive wire causes a problem of localized excessive expansion or a break occurring during formation of the magnet coil. Each of the enamel wires in the Litz wire are bundled simply in the substantially same direction as a direction in which the Litz wire as a whole extends, so that forming the Litz wire into the shape of the coil of this embodiment causes a break in a thin enamel wire in the Litz wire. By contrast, the coil conductive wire 410 shown in FIG. 11 includes the conductive wire bundle 412 as a bundle of the multiple non-insulated conductive wires 411, and the insulating coating layer 414 covering the periphery of the conductive wire bundle 412. This achieves reduction in the occurrence of localized excessive expansion or a break of the magnet coil. The experiment conducted by the present inventor shows that, regarding the first coil conductive wire 410, even with the diameter of the non-insulated conductive wire 411 smaller than the diameter of a copper wire in a commercially-available Litz wire, the occurrence of a break is still reduced compared to the Litz wire.

The present inventor further examined the magnitude of an eddy current generated at the first coil conductive wire 410 experimentally, and found that the diameter of the conductive wire is reducible compared to the case of using a Litz wire to allow significant reduction in the eddy current.

Insulating properties for withstanding potential differences occurring between coils and between phases may be ensured by further covering each of the magnet coils 210 and 220 entirely with the second insulating covering after forming each of the magnet coils 210 and 220 using the first coil conductive wire 410 according to the steps described above by referring to FIGS. 10A to 10C. The second insulating covering is preferably made of an insulating material having more excellent withstand voltage characteristics than the insulating coating layer 414 around the conductive wire bundle 412. Unlike the inside of a coil where a wire is wound many turns, the outside of the coil allows suppression of size increase of the coil as a whole even with the use of a thick insulating covering.

In this case, when each of coils are assembled into a coil assembly, coils of the same phase and the same shape are arranged adjacent to each other, and currents in the same direction flow in the adjacent effective coil parts VCP. Thus, the outside part of the second insulating covering of each of the coils may be thin. Conversely, coils of opposite phases and different shapes are arranged adjacent to each other in the air core region in each coil. Thus, it is preferable that the inside part of the second insulating covering of each coil is made thicker than its outside part.

An eddy current flows in an eddy pattern in a sectional direction of the non-insulated conductive wire 411 forming a coil, so that a smaller sectional area of the non-insulated conductive wire 411 is more preferable. More specifically, setting the sectional area to 0.04 mm$^2$ or less is preferable. More preferably, the sectional area may be set to 0.02 mm$^2$ or less. Meanwhile, such a configuration should be given consideration in terms of increase in electrical resistance resulting from reduction in the sectional area.

A second coil conductive wire 420 shown in the middle row of FIG. 11 also includes a conductive wire bundle 422 as a bundle of multiple non-insulated conductive wires 421 each being a non-insulated wire, and an insulating coating layer 424 covering the periphery of the conductive wire bundle 422. The non-insulated conductive wire 421 is a bare copper wire, for example. A self-welding layer 426 is formed around the insulating coating layer 424. The conductive wire bundle 422 is braided, in this example, flat braided. While the coil conductive wire 420 has a substantially rectangular shape in a section, it may be formed into a circular shape in a section. The coil conductive wire 420, which includes the braided conductive wire bundle 422, achieves improvement of the stretching properties of the coil conductive wire 420. As a result, it becomes possible to further reduce the occurrence of localized excessive expansion or a break of a magnet coil when the magnet coil is formed by winding the coil conductive wire 420. In particular, the flat braiding of the conductive wire bundle 422 makes it possible to improve stretching properties in both of two orthogonal directions (right-to-left direction and top-to-bottom direction in FIG. 11).

The magnitude of an eddy current generated at the second coil conductive wire 420 was reduced considerably, compared to the case of the first coil conductive wire 410. Possible reason for this is that braiding the conductive wire bundle 422 allows considerable reduction in the diameter of the non-insulated conductive wire 421 compared to the diameter of a copper wire in a Litz wire and fragments a path of an eddy current further, making the occurrence of an eddy current unlikely.

In this configuration in which the non-insulated conductive wires 421 are braided, setting the sectional area of each non-insulated conductive wire 421 to 0.04 mm$^2$ or less or 0.02 mm$^2$ or less for increasing the effect of suppressing an eddy current does not cause a problem resulting from increased electrical resistance. Possible reason for this is that, while the electromotive force of an eddy current is small and thus the eddy current fails to flow across the non-insulated conductive wires 421 and attenuates, a coil current is supplied by application of a sufficient voltage to flow across non-insulated conductive wires. Possible reason is also that the reticulated structure makes each of the non-insulated conductive wires 421 extend in a different direction from the direction of the coil conductive wire as a whole, so that the electromotive force of an eddy current is generated across the non-insulated conductive wires 421.

A third coil conductive wire 430 shown in the lower row of FIG. 11 also includes a conductive wire bundle 432 as a bundle of multiple non-insulated conductive wires 431 each being a non-insulated wire, and an insulating coating layer 434 covering the periphery of the conductive wire bundle 432. The non-insulated conductive wire 431 is a bare copper wire, for example. A self-welding layer 436 is formed around the insulating coating layer 434. A plated layer 438 (for example, Sn-plated layer) is formed on a surface of each non-insulated conductive wire 431. The conductive wire bundle 432 is braided, in this example, flat braided. While the coil conductive wire 430 has a substantially rectangular shape in a section, it may be formed into a circular shape in a section. The coil conductive wire 430, which includes the conductive wire bundle 432 also braided, achieves improvement of the stretching properties of the coil conductive wire 430. As a result, it becomes possible to further reduce the occurrence of localized excessive expansion or a break of a magnet coil when the magnet coil is formed by winding the coil conductive wire 430.

The magnitude of an eddy current generated at the third coil conductive wire 430 was slightly larger than that in the case of the second coil conductive wire 420 and was substantially the same as that in the case of the first coil conductive wire 410. Possible reason for this is that the presence of the plated layer 438 facilitates flow of the eddy current across the non-insulated conductive wires 431. Thus, from the viewpoint of reducing an eddy current, using a non-plated copper wire as a non-insulated conductive wire like the second coil conductive wire 420 is preferable.

As described above, in the first embodiment, the outer shape of each of the magnet coils 210 and 220 in a section perpendicular to the center axis C of the rotor 300 is a divided ring-like shape defined by dividing a circular ring into equal N parts, and an angle between two sides of the divided ring-like shape is set to be 360°/N or less. This prevents interference between the magnet coils 210 and 220 at an inner position near the rotor 300 to facilitate formation of the coil assembly 230AB by assembling of the multiple magnet coils 210 and 220. Further, each of the magnet coils 210 and 220 is made of a coil conductive wire including a conductive wire bundle as a bundle of multiple non-insulated conductive wires each being a non-insulated wire, and an insulating coating layer covering the periphery of the conductive wire bundle. This makes it possible to reduce the occurrence of localized excessive expansion or a break of the magnet coil 210 or 220.

B. Second Embodiment

Figure 12:
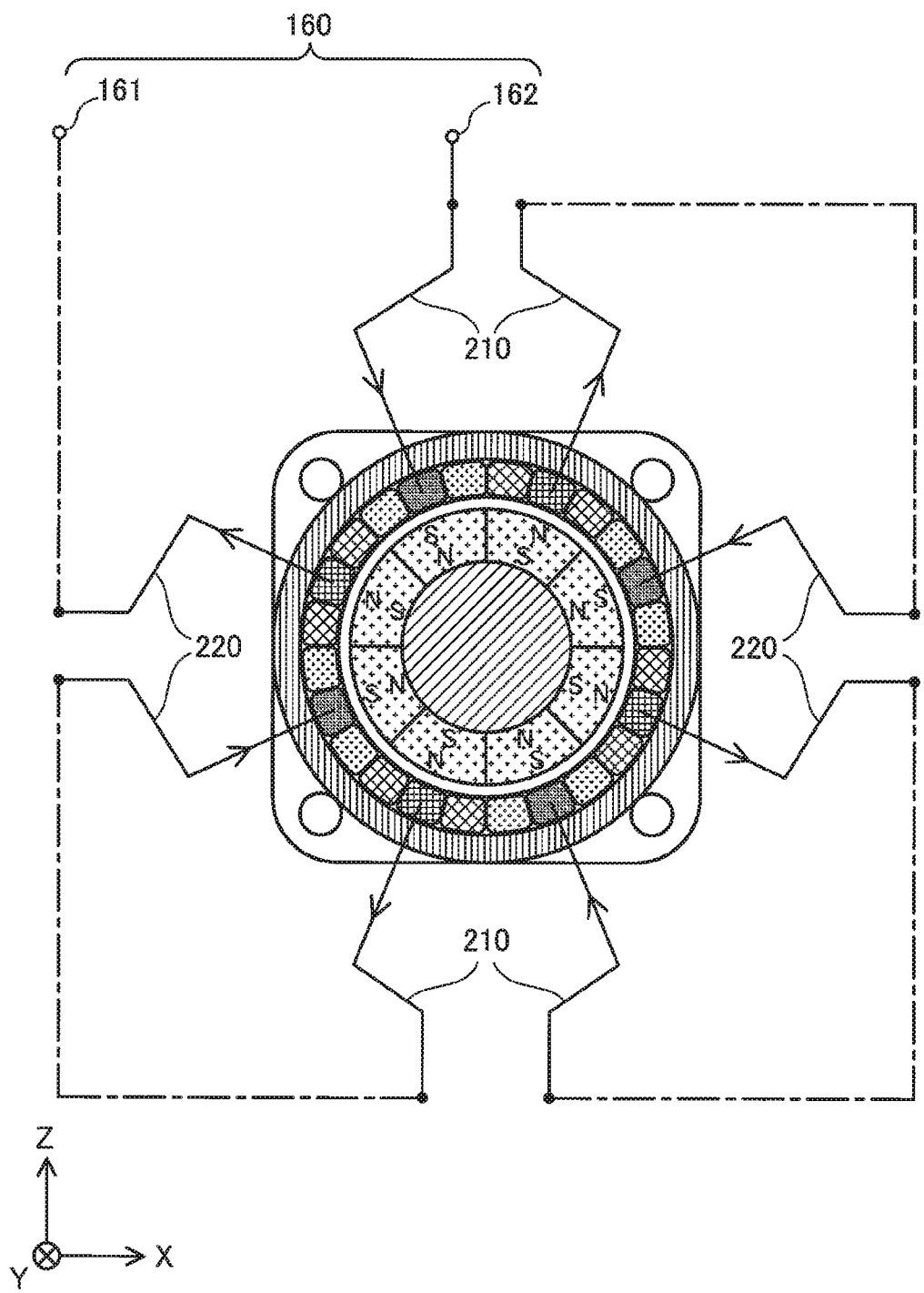
FIG. 12 is an explanatory view showing a connection state of magnet coils corresponding to one phase according to a second embodiment.

FIG. 12 is an explanatory view showing a connection state of magnet coils corresponding to one phase according to a second embodiment, and corresponding to FIG. 3 relating to the first embodiment. The sectional structures of the coreless motor shown in FIGS. 1 and 2 and the respective shapes of the first shape coil 210 and the second shape coil 220 according to the first embodiment also apply to the second embodiment. The second embodiment is the same as the first embodiment except for two points: the magnet coils 210 and 220 are connected to each other in a different state; and a coreless motor of the second embodiment is configured as a three-phase motor.

In the second embodiment, a magnet coil corresponding to one phase is formed by selecting the first shape coils 210 and the second shape coils 220 at regular intervals, and connecting the selected coils in sequence. In the illustration of FIG. 12, two first shape coils 210 and two second shape coils 220 are connected to form a magnet coil corresponding to one phase. Arrows given to coil conductive wires show current directions. The first shape coils 210 and the second shape coils 220 are connected in such a manner that magnetic fields generated by currents are pointed in reversed directions (a radially outward direction and a radially inward direction). This connection state also applies to magnet coils corresponding to the other two phases.

Figure 13:
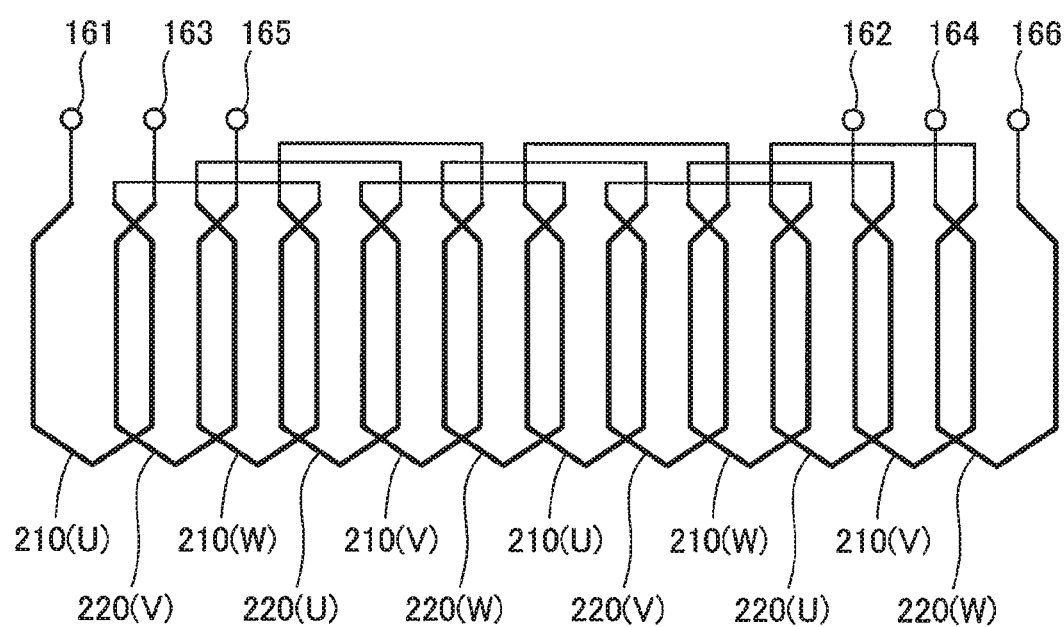
FIG. 13 is an explanatory view showing a connection state of magnet coils corresponding to three phases according to the second embodiment.

FIG. 13 is an explanatory view showing a connection state of the magnet coils 210 and 220 according to the second embodiment and corresponding to FIG. 4 relating to the first embodiment. In this example, both the first shape coils 210 and the second shape coils 220 are classified into three phases; coils corresponding to a U phase, coils corresponding to a V phase, and coils corresponding to a W phase. The first shape coils 210 and the second shape coils 220 corresponding to the U phase are electrically connected in sequence to form the U phase. Likewise, the first shape coils 210 and the second shape coils 220 corresponding to the V phase are electrically connected in sequence to form the V phase, and the first shape coils 210 and the second shape coils 220 corresponding to the W phase are electrically connected in sequence to form the W phase. In FIG. 13, characters "(U)," "(V)," and "(W)" added after the signs 210 and 220 of magnet coils show differences between the U phase, the V phase, and the W phase. The two coil terminals 161 and 162 are provided at the opposite ends of the U-phase coil. Likewise, two coil terminals 163 and 164 are provided at the opposite ends of the V-phase coil, and two coil terminals 165 and 166 are provided at the opposite ends of the W-phase coil. As understood from this explanation, changing a connection state of magnet coils makes it possible to form the two-phase motor shown in FIG. 4 and the three-phase motor shown in FIG. 13 using the same coil structure, thereby achieving the economics of mass production. Meanwhile, to make a change between a two-phase motor and a three-phase motor only through such change in a connection state, the number N of coils is preferably set to be multiples of six for both the first shape coils 210 and the second shape coils 220.

The second embodiment achieves effects comparable to those achieved by the first embodiment.

The electric machine described in the foregoing embodiments is to make rotary motion. Meanwhile, the present invention is further applicable to an electric machine to make linear motion (linear motor, for example). In particular, the electric machine to make linear motion such as a linear motor is very likely to encounter a break in a coil conductive wire. Thus, employing a magnet coil formed by using the foregoing coil conductive wire achieves notable effect in suppressing a break in the coil conductive wire.

The electric machine described in each of the foregoing embodiments has an inner rotor structure with a rotor arranged inside a coil assembly. Meanwhile, the present invention is further applicable to an electric machine having an outer rotor structure with a rotor arranged outside a coil assembly.

Figure 14:
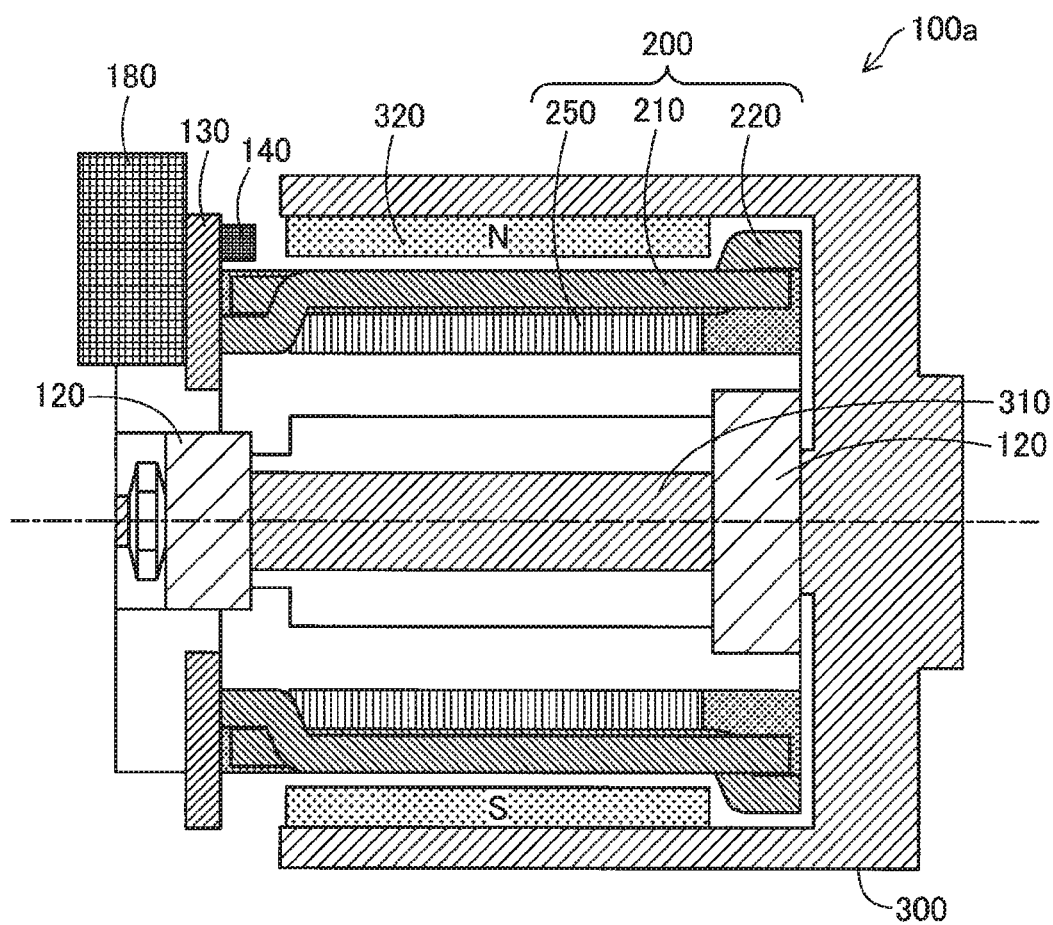
FIG. 14 is a sectional view showing a coreless motor having an outer rotor structure.

FIG. 14 is a sectional view showing a coreless motor 100a as an example of an electric machine having an outer rotor structure. Parts corresponding to those of the coreless motor 100 having the inner rotor structure shown in FIG. 1 are given the same signs and will not be described in detail. In the coreless motor 100a shown in FIG. 14, the permanent magnet 320 of the rotor 300 is arranged external to the stator 200 with the magnet coils 210 and 220 in the radial direction in the presence of a gap between the permanent magnet 320 and the stator 200. The magnetic sensor 140 on the circuit board 130 is mounted on a position facing the permanent magnet 320. A connector 180 for connection to an external wire is connected to the circuit board 130. Like in the inner rotor structure, the stator 200 in the outer rotor structure is arranged concentrically with the rotor 300 in the presence of a gap from the rotor 300. The electric machine having this outer rotor structure achieves effects substantially comparable to those achieved by the electric machine having the inner rotor structure.

The present invention is not limited to the rotary electric machine but is further applicable to a linear electric machine. This application may be realized by changing the "rotor that rotates about the center axis" described in the foregoing embodiments to a "slider that moves along a movement axis," for example. Additionally, a magnet coil is not required to have a divided ring-like outer shape.

The present invention is not limited to the above-described embodiments, examples, or modifications but is feasible in the form of various configurations within a range not deviating from the substance of the invention. For example, technical features in the embodiments, those in the examples, or those in the modifications corresponding to those in each of the aspects described in SUMMARY may be replaced or combined, where appropriate, with the intention of solving some or all of the aforementioned problems or achieving some or all of the aforementioned effects. Unless being described as absolute necessities in this specification, these technical features may be deleted, where appropriate.

REFERENCE SIGNS LIST

100 . . . Coreless motor, 110 . . . Casing, 120 . . . Bearing, 130 . . . Circuit board, 140 . . . Magnetic sensor, 150 . . . Connecting substrate, 160, 161 to 166 . . . Coil terminal, 170 . . . Resin, 200 . . . Stator, 210 . . . First shape coil (magnet coil), 210A . . . First coil subassembly, 210d, 210u . . . Coil part, 211 . . . First coil end part, 212 . . . Second coil end part, 213 . . . Air core region, 214 . . . Effective coil part, 215, 216 . . . Coil end, 217, 218 . . . Side, 220 . . . Second shape coil, 220A . . . Second coil subassembly, 221 . . . First coil end part, 222 . . . Second coil end part, 223 . . . Air core region, 224 . . . Effective coil part, 225, 226 . . . Coil end, 227, 228 . . . Side, 230AB . . . Coil assembly, 250 . . . Coil back yoke, 300 . . . Rotor, 310 . . . Rotor shaft, 320 . . . Permanent magnet, 410 . . . Coil conductive wire, 411 . . . Non-insulated conductive wire, 412 . . . Conductive wire bundle, 414 . . . Insulating coating layer, 416 . . . Self-welding layer, 420 . . . Coil conductive wire, 421 . . . Non-insulated conductive wire, 422 . . . Conductive wire bundle, 424 . . . Insulating coating layer, 426 . . . Self-welding layer, 430 . . . Coil conductive wire, 431 . . . Non-insulated conductive wire, 432 . . . Conductive wire bundle, 434 . . . Insulating coating layer, 436 . . . Self-welding layer, 438 . . . Plated layer

What is claimed is:

1. A coreless electric machine comprising:
a rotor including a permanent magnet and rotating about a center axis; and
a stator with a coil assembly including a combination of 2N magnet coils where N is an integer of two or more, the stator being arranged concentrically with the rotor via a gap from the rotor, wherein
each of the magnet coils is configured as a concentrated winding coil including an effective coil part, a first coil end part and a second coil end part provided on opposite sides of the effective coil part, and an air core region surrounded by the effective coil part, the first coil end part, and the second coil end part,
the 2N magnet coils include N first shape coils each having a shape in which the first coil end part is bent inwardly from the effective coil part in a radial direction of the stator, and N second shape coils each having a shape in which the second coil end part is bent outwardly from the effective coil part in the radial direction,
outer side surfaces of the effective coil parts of adjacent ones of the first shape coils contact each other,
outer side surfaces of the effective coil parts of adjacent ones of the second shape coils contact each other,
the coil assembly has a structure in which (i) the effective coil part of the second shape coil is housed in the air core region of the first shape coil, and the effective coil part of the first shape coil is housed in the air core region of the second shape coil; and (ii) the first shape coils and the second shape coils are arranged alternately, one by one,
the outer shape of each of the magnet coils in a section perpendicular to the center axis is a divided ring-like shape defined by dividing a circular ring into equal N parts, and two sides of the divided ring-like shape form an angle set to be 360°/N or less,
a total length of the first coil end part and the second coil end part of each of the first shape coils along the center axis is greater than a total length of the first coil end part and the second coil end part of each of the second shape coils along the center axis, and
coil conductive wires for the first shape coil and the second shape coil have an equal length.

2. The coreless electric machine according to claim 1, wherein
the length of the first coil end part of each of the first shape coils along the center axis is greater than the length of the second coil end part of each of the second shape coils along the center axis.

3. The coreless electric machine according to claim 1, wherein
an array of the coil conductive wire in each of the magnet coils in a section perpendicular to the center axis includes multiple layers stacked in the radial direction, and the number of turns of the coil conductive wire in each of the multiple layers is set in such a manner that the number of turns of the coil conductive wire increases monotonously in a more external layer in the radial direction.

4. The coreless electric machine according to claim 1, wherein
each of the magnet coils includes the coil conductive wire including a conductive wire bundle as a bundle of multiple non-insulated conductive wires each being a non-insulated wire, and an insulating coating layer covering periphery of the conductive wire bundle.

5. The coreless electric machine according to claim 4, wherein
the conductive wire bundle is braided.

6. The coreless electric machine according to claim 4, wherein
each of the non-insulated conductive wires is a non-plated copper wire.

* * * * *